(12) United States Patent
Ozawa

(10) Patent No.: US 12,041,345 B2
(45) Date of Patent: Jul. 16, 2024

(54) TRANSMISSION DEVICE, RECEPTION DEVICE, AND COMMUNICATION SYSTEM

(71) Applicant: Sony Semiconductor Solutions Corporation, Kanagawa (JP)

(72) Inventor: Miho Ozawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 222 days.

(21) Appl. No.: 17/618,021

(22) PCT Filed: Jun. 9, 2020

(86) PCT No.: PCT/JP2020/022712
§ 371 (c)(1),
(2) Date: Dec. 10, 2021

(87) PCT Pub. No.: WO2020/255799
PCT Pub. Date: Dec. 24, 2020

(65) Prior Publication Data
US 2022/0239827 A1 Jul. 28, 2022

(30) Foreign Application Priority Data
Jun. 18, 2019 (JP) .................. 2019-112495

(51) Int. Cl.
*H04N 23/661* (2023.01)
*H04N 7/18* (2006.01)
*H04N 21/236* (2011.01)

(52) U.S. Cl.
CPC ........... *H04N 23/661* (2023.01); *H04N 7/183* (2013.01); *H04N 21/236* (2013.01)

(58) Field of Classification Search
CPC ...... H04N 23/661; H04N 21/236; H04N 7/08; H04N 7/183
See application file for complete search history.

(56) References Cited

U.S. PATENT DOCUMENTS

| | | | |
|---|---|---|---|
| 6,785,889 B1 * | 8/2004 | Williams | G06F 9/50 709/240 |
| 8,867,895 B2 * | 10/2014 | Hosokawa | H04N 9/8042 386/200 |
| 8,970,750 B2 * | 3/2015 | Sugioka | G06F 13/385 714/701 |
| 11,043,965 B2 * | 6/2021 | Wu | H03M 13/11 |
| 11,196,961 B2 * | 12/2021 | Yoshimochi | H04N 7/0357 |

(Continued)

FOREIGN PATENT DOCUMENTS

| | | |
|---|---|---|
| JP | 2012-120158 A | 6/2012 |
| JP | 2012120159 A | 6/2012 |
| JP | 2017204738 A | 11/2017 |

OTHER PUBLICATIONS

International Search Report (PCT/ISA/210), International Application No. PCT/JP2020/022712, dated Aug. 31, 2020.

*Primary Examiner* — Michael B. Pierorazio
(74) *Attorney, Agent, or Firm* — Michael Best & Friedrich LLP

(57) ABSTRACT

A transmission device according to the present disclosure includes: a data generator configured to generate image data including, as image information, pixel value information obtained by imaging pixels and control information; and a transmission unit configured to transmit the image data.

13 Claims, 14 Drawing Sheets

(56) References Cited

U.S. PATENT DOCUMENTS

| | | | |
|---|---|---|---|
| 11,743,423 B2* | 8/2023 | Yoshimochi | H04L 25/14 |
| | | | 710/5 |
| 2005/0246705 A1* | 11/2005 | Etelson | G06F 8/70 |
| | | | 718/100 |
| 2007/0105573 A1* | 5/2007 | Gupta | H04W 72/20 |
| | | | 455/39 |
| 2007/0105576 A1* | 5/2007 | Gupta | H04W 52/243 |
| | | | 455/39 |
| 2009/0176503 A1* | 7/2009 | Sampath | H04W 72/20 |
| | | | 455/450 |
| 2009/0210539 A1* | 8/2009 | Funabiki | H04L 12/2805 |
| | | | 709/228 |
| 2011/0037841 A1* | 2/2011 | Shibasaki | A61B 1/07 |
| | | | 348/E7.085 |
| 2012/0120289 A1* | 5/2012 | Sugioka | G06T 1/0007 |
| | | | 348/294 |
| 2013/0042250 A1* | 2/2013 | Lim | G06F 9/4881 |
| | | | 718/103 |
| 2013/0042251 A1* | 2/2013 | Nader | G06F 9/4881 |
| | | | 718/103 |
| 2013/0169774 A1* | 7/2013 | Ozawa | A61B 1/00009 |
| | | | 348/65 |
| 2014/0111612 A1* | 4/2014 | Tsukagoshi | H04N 19/597 |
| | | | 348/43 |
| 2018/0048790 A1* | 2/2018 | Adachi | A61B 1/00009 |
| 2018/0109727 A1* | 4/2018 | Tamai | A61B 1/00009 |
| 2019/0075290 A1* | 3/2019 | Dubey | H04N 17/002 |
| 2020/0195884 A1* | 6/2020 | Yoshimochi | H04N 7/0357 |
| 2022/0094878 A1* | 3/2022 | Yoshimochi | G06F 3/147 |

* cited by examiner

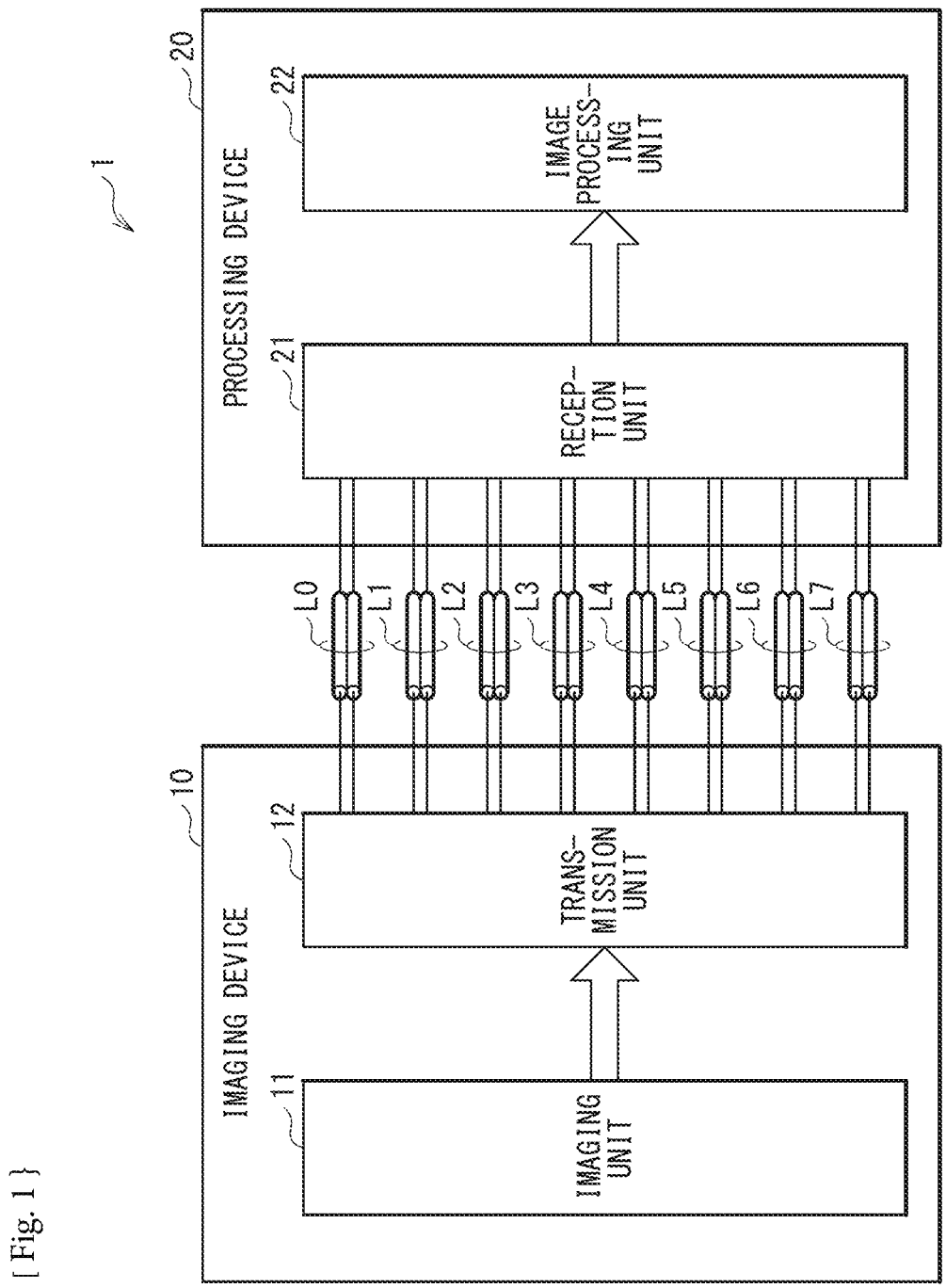
[Fig. 1]

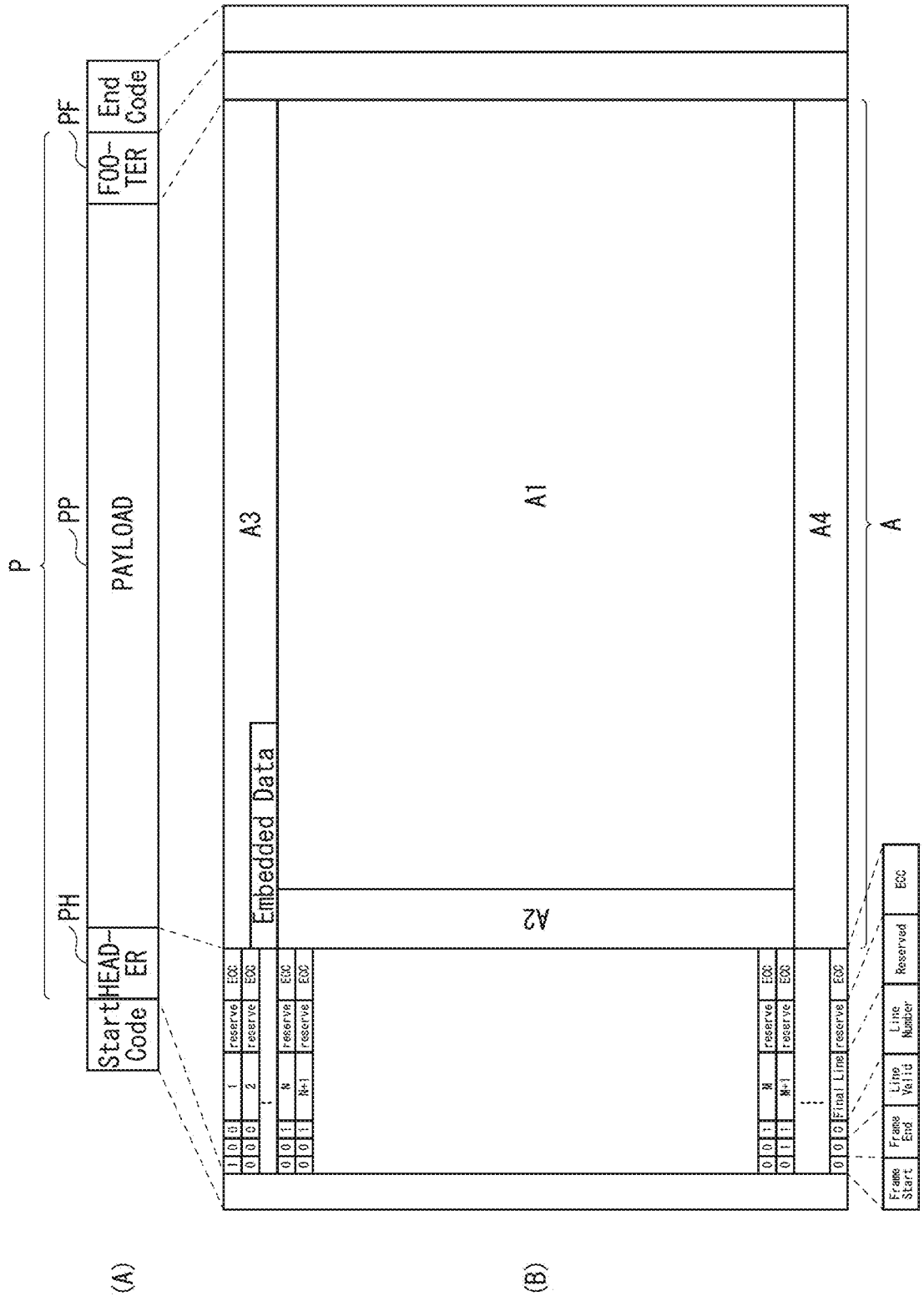

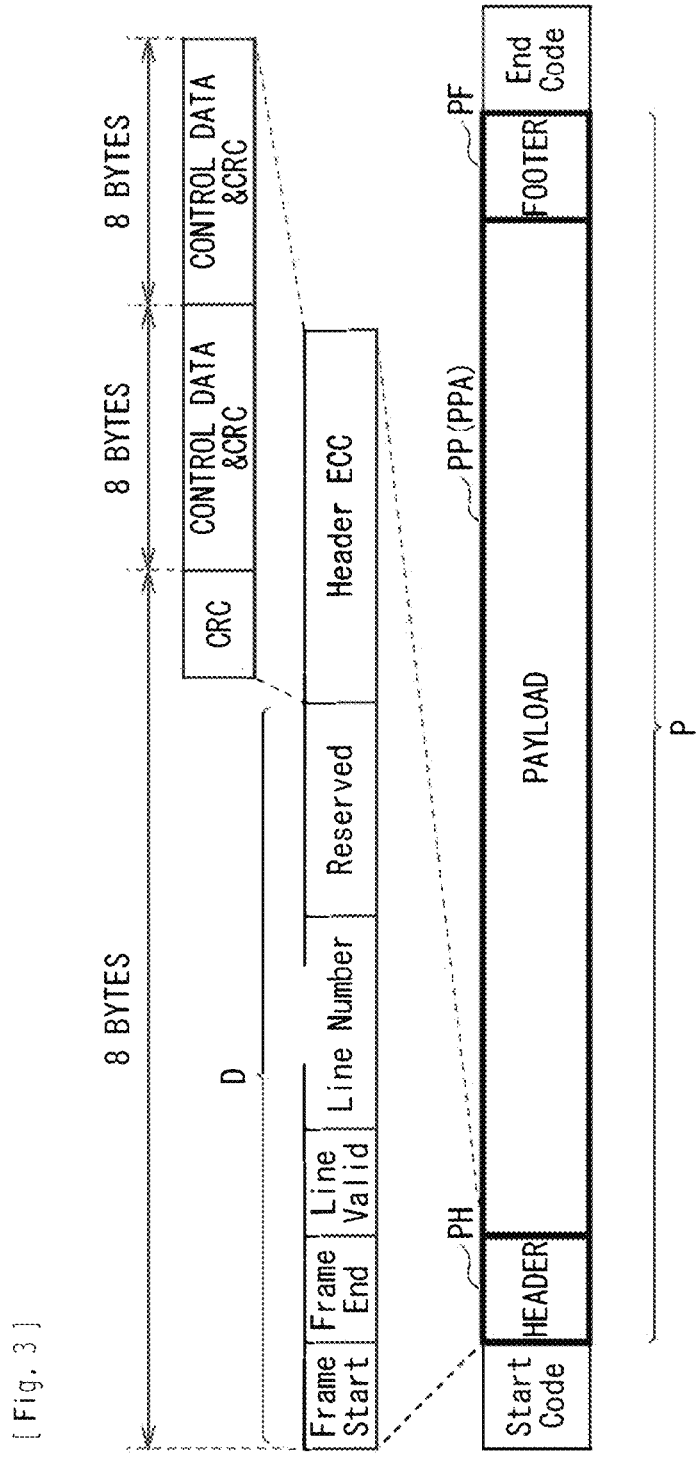
[Fig. 3]

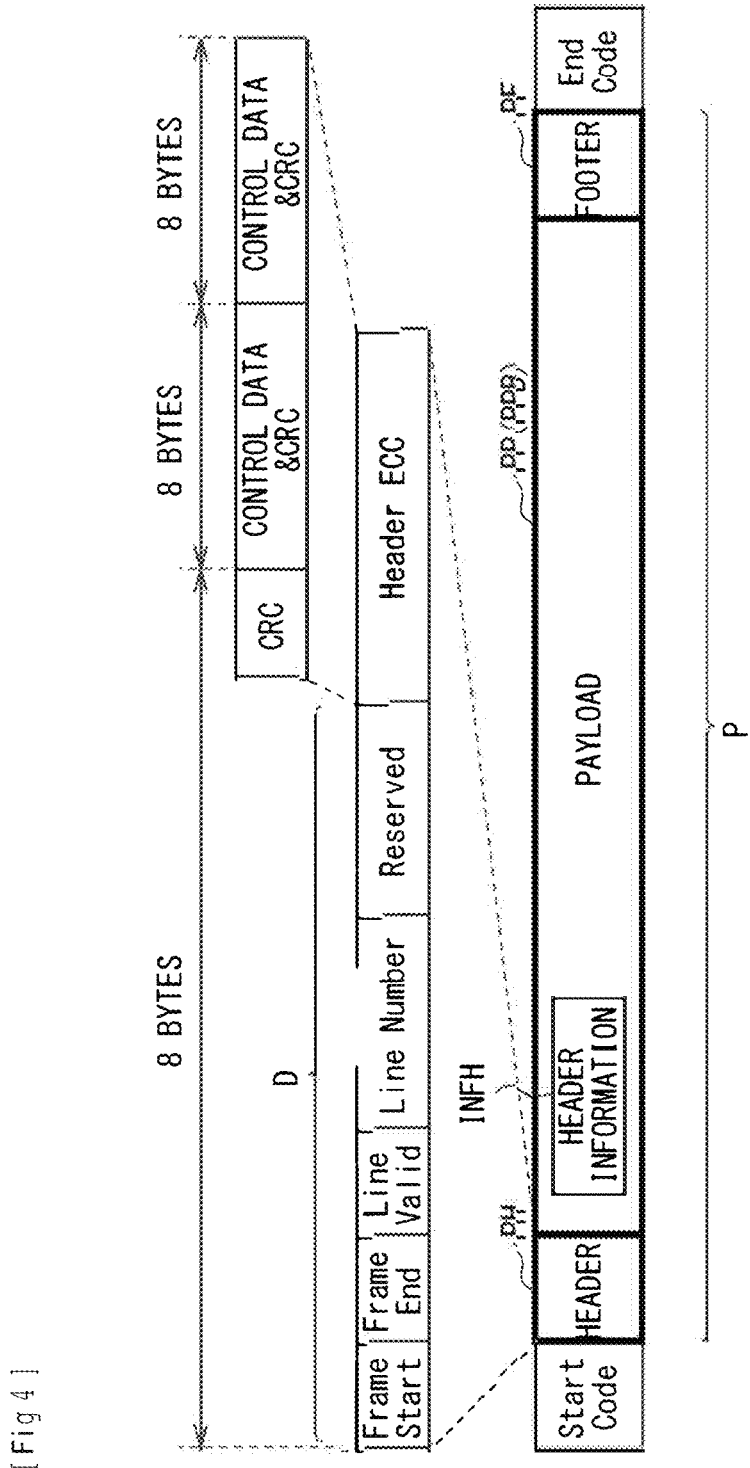
[Fig 4]

[FIG.5]
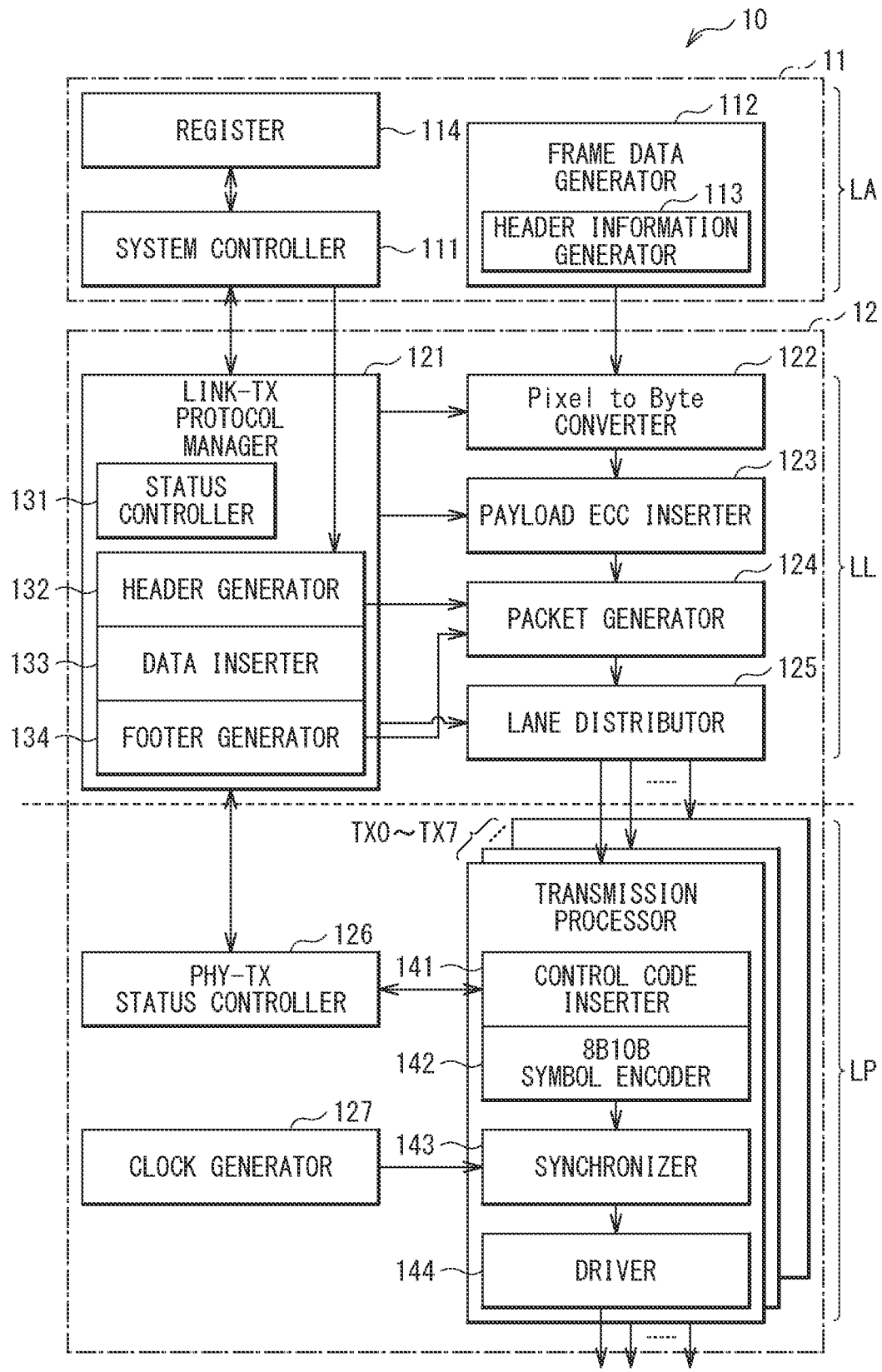

[FIG. 6]
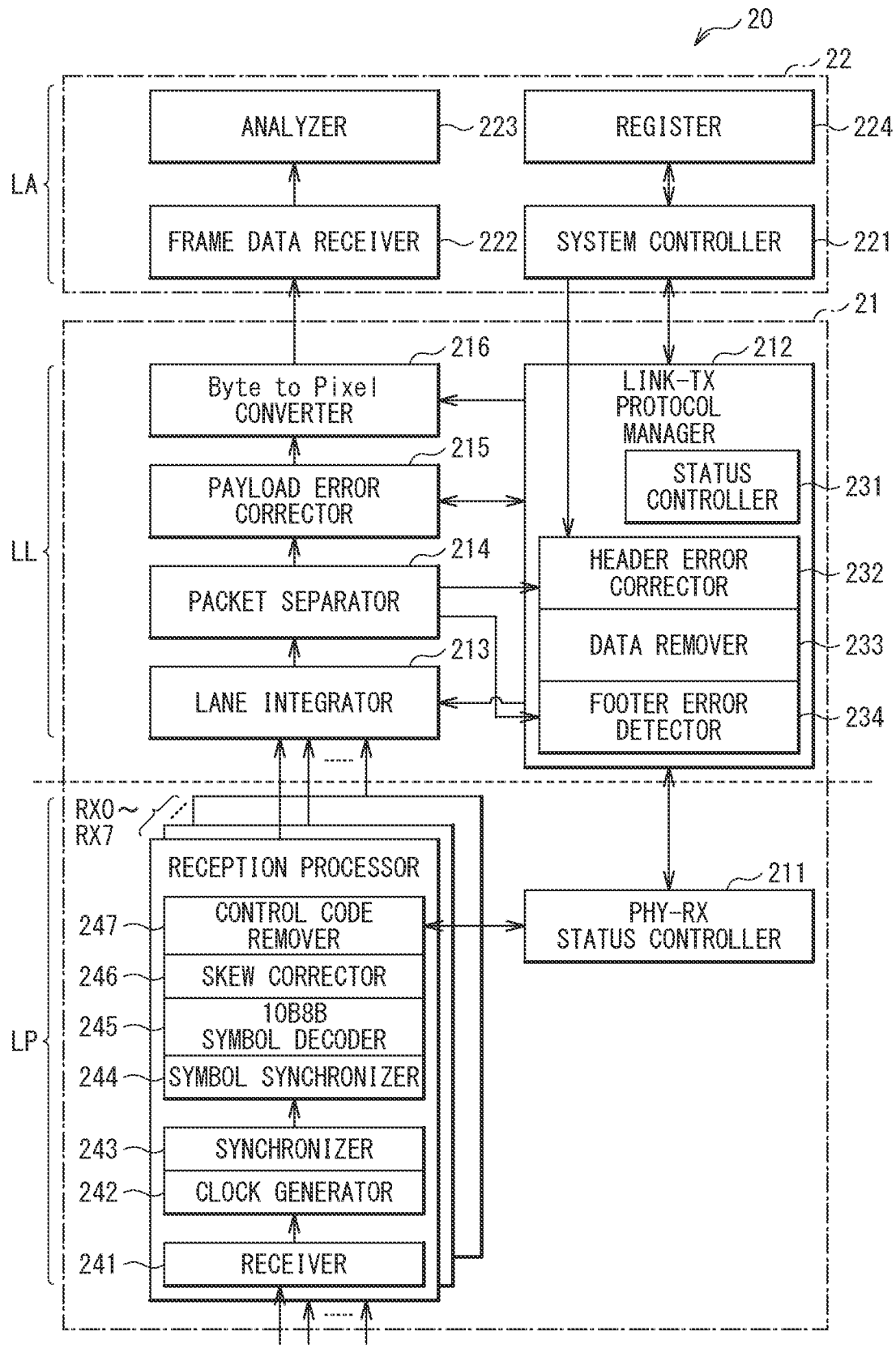

[FIG. 7]
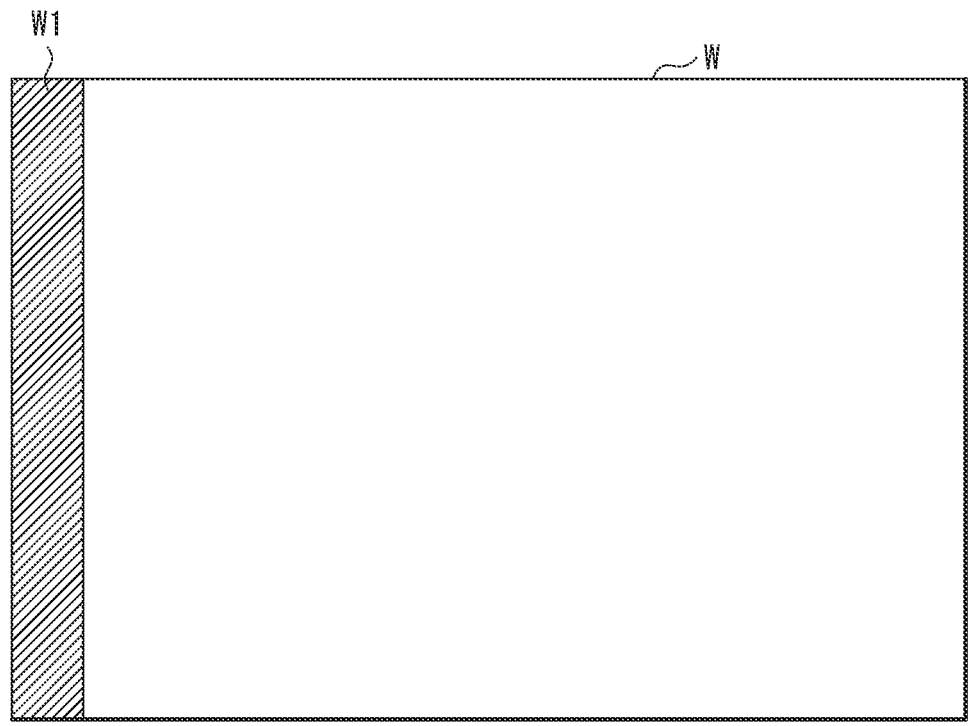

[FIG. 8]
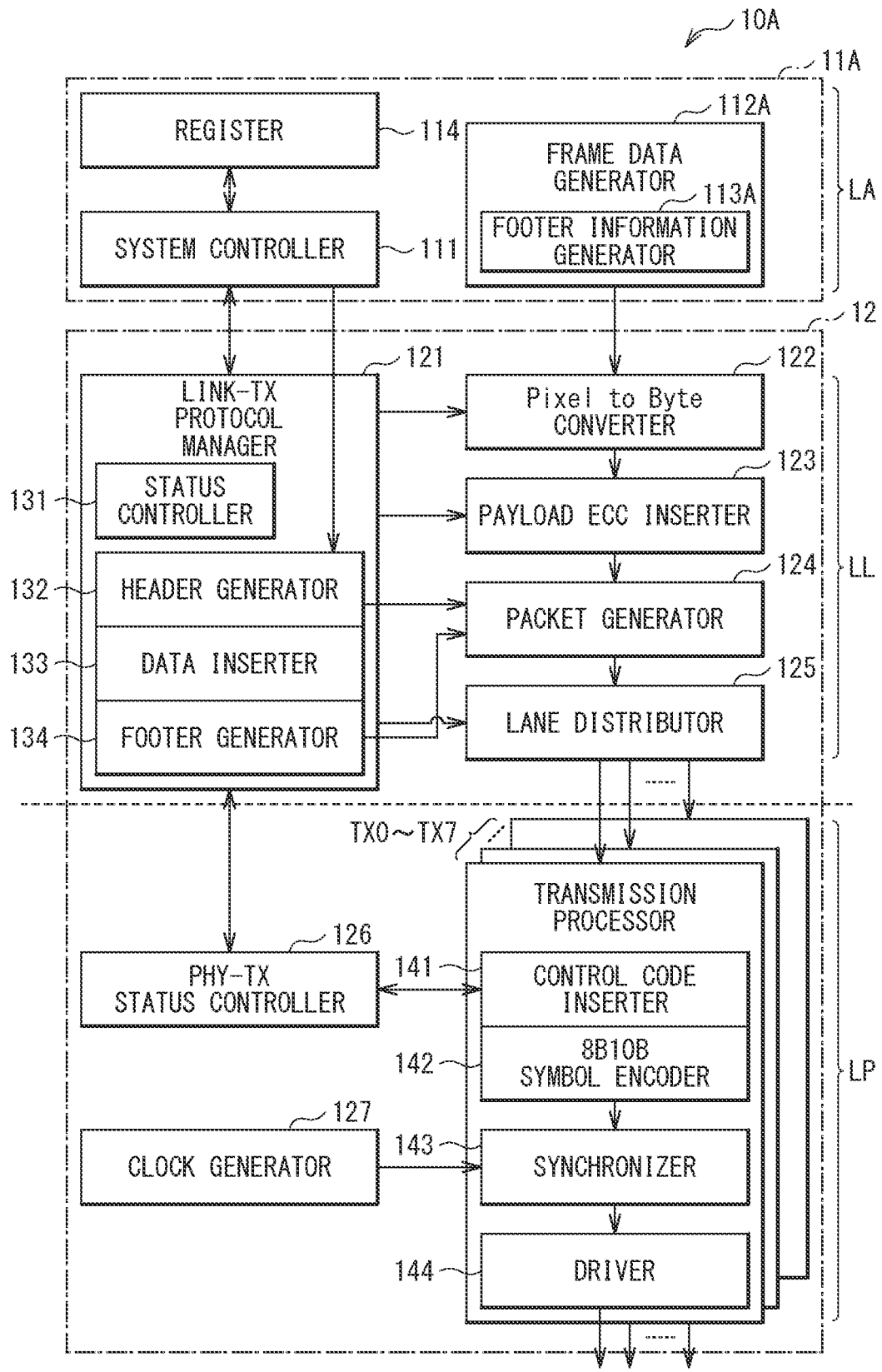

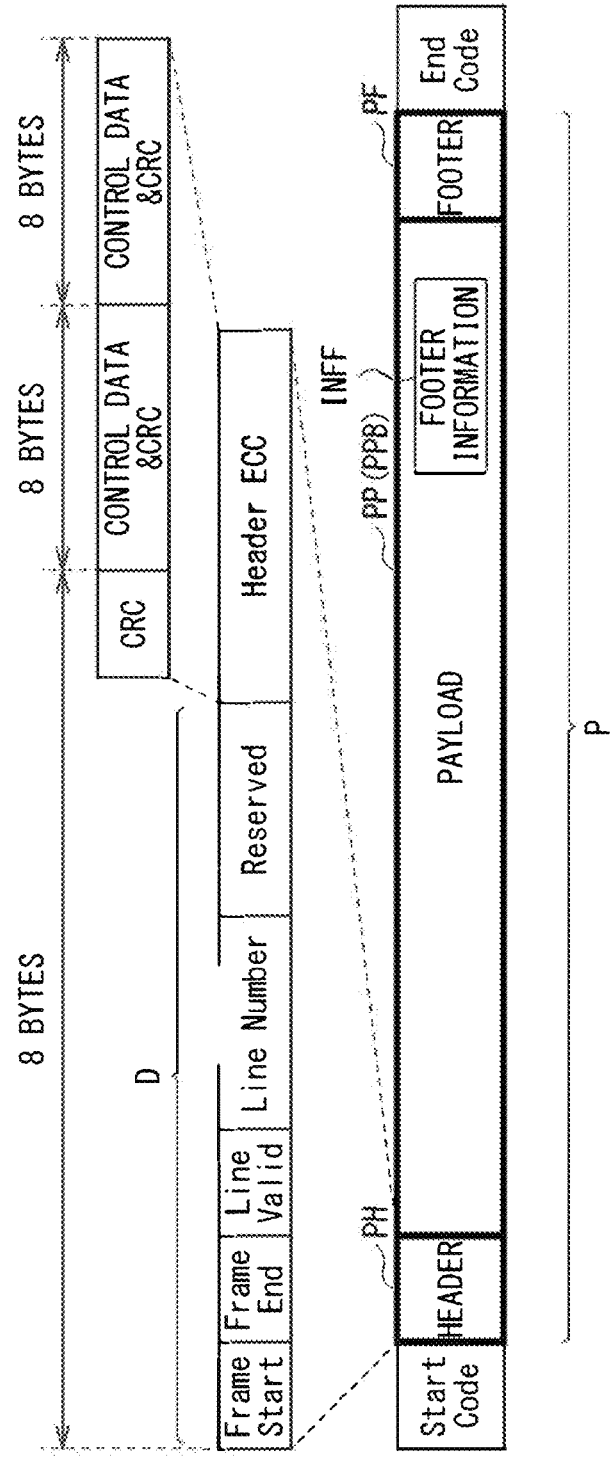
[Fig. 9]

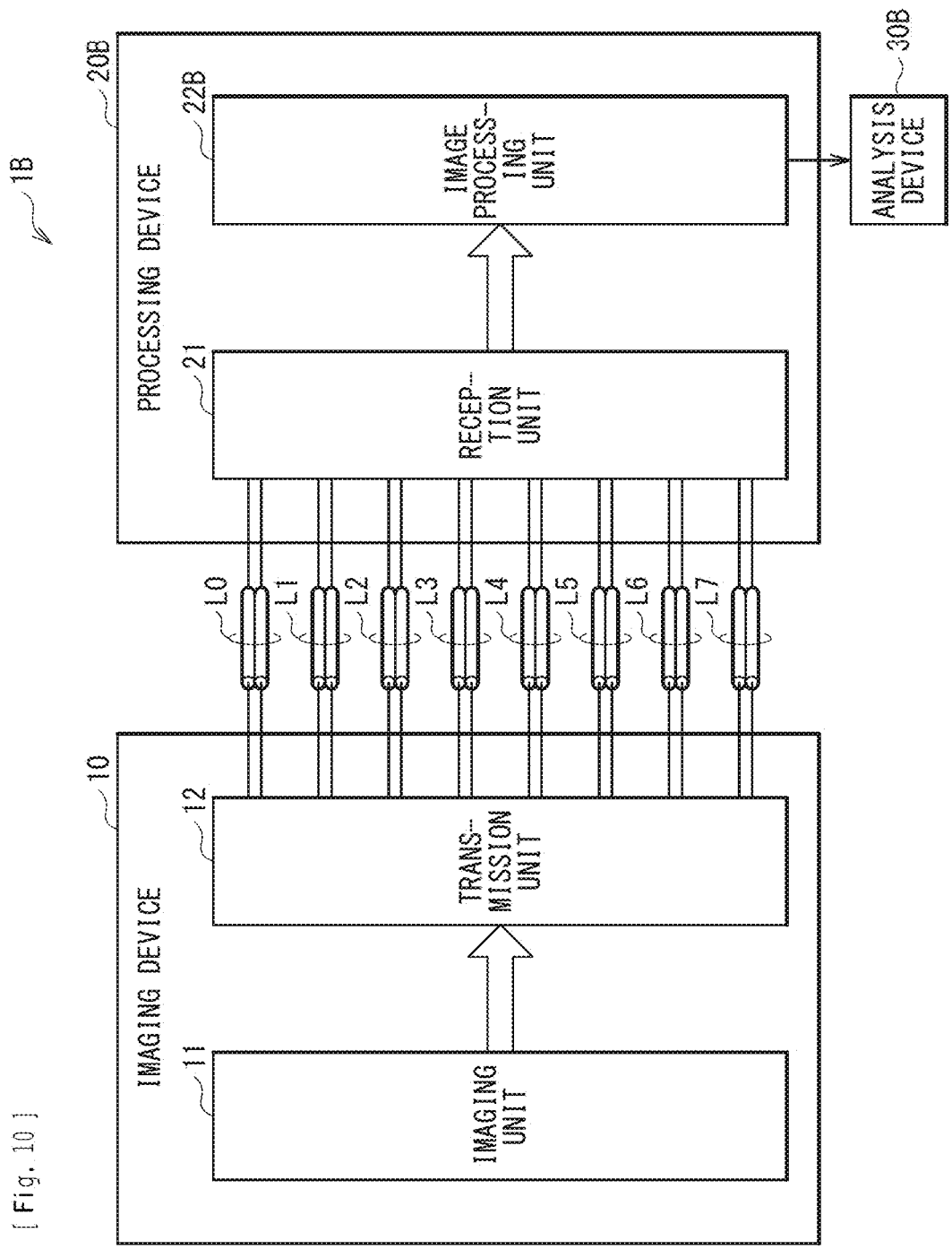
[Fig. 10]

[FIG. 11]
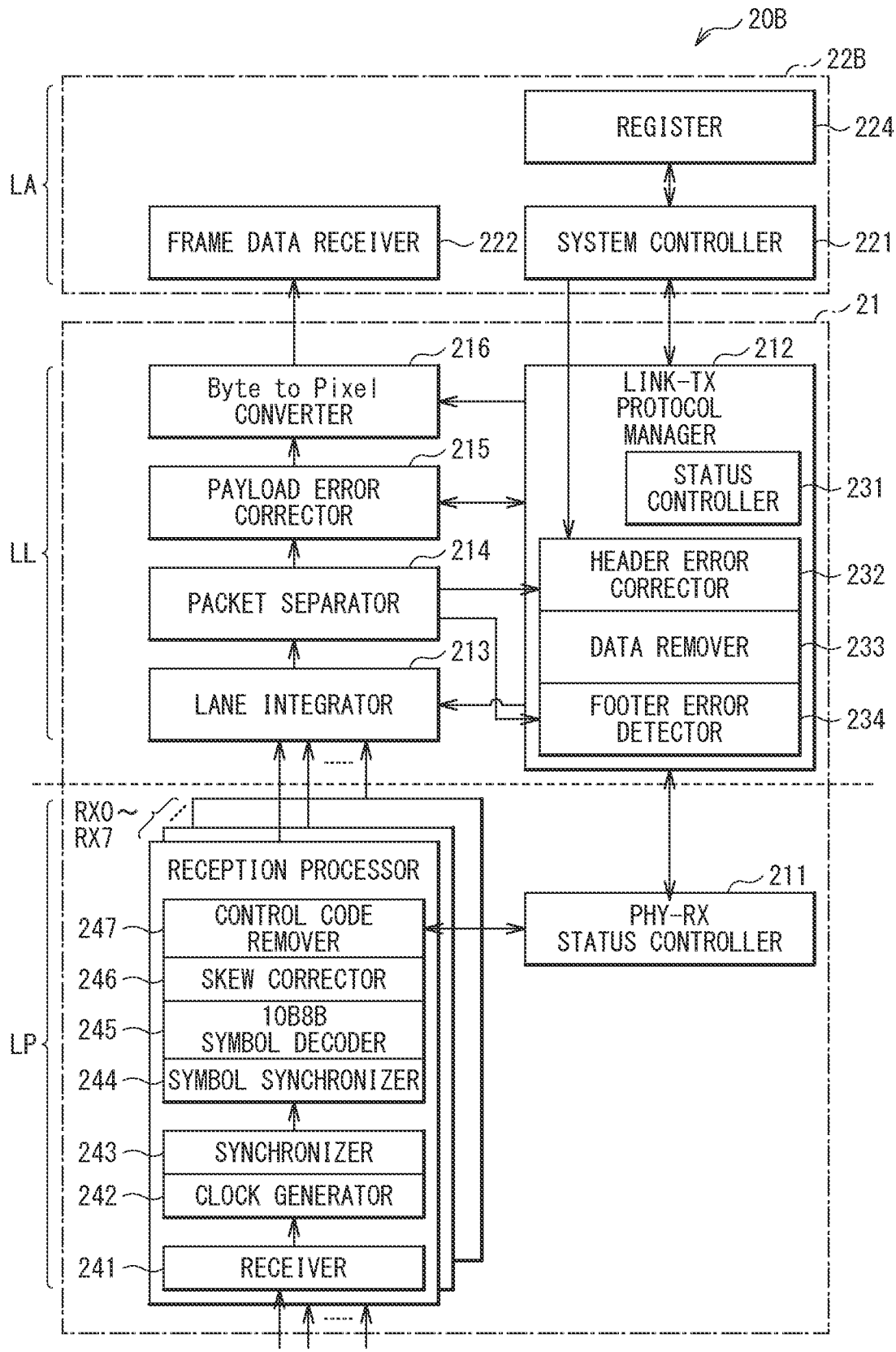

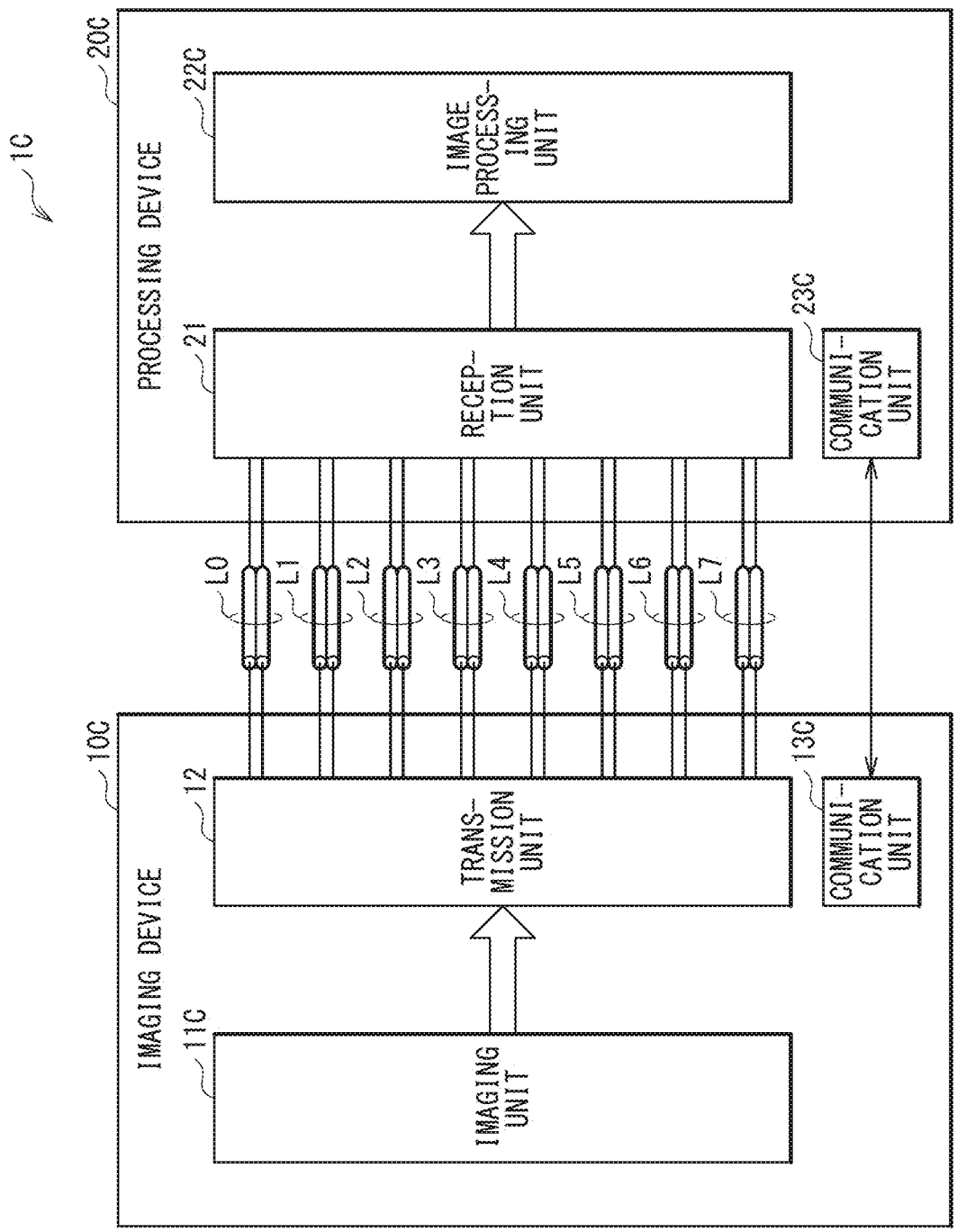
[Fig. 12]

[ FIG. 13 ]
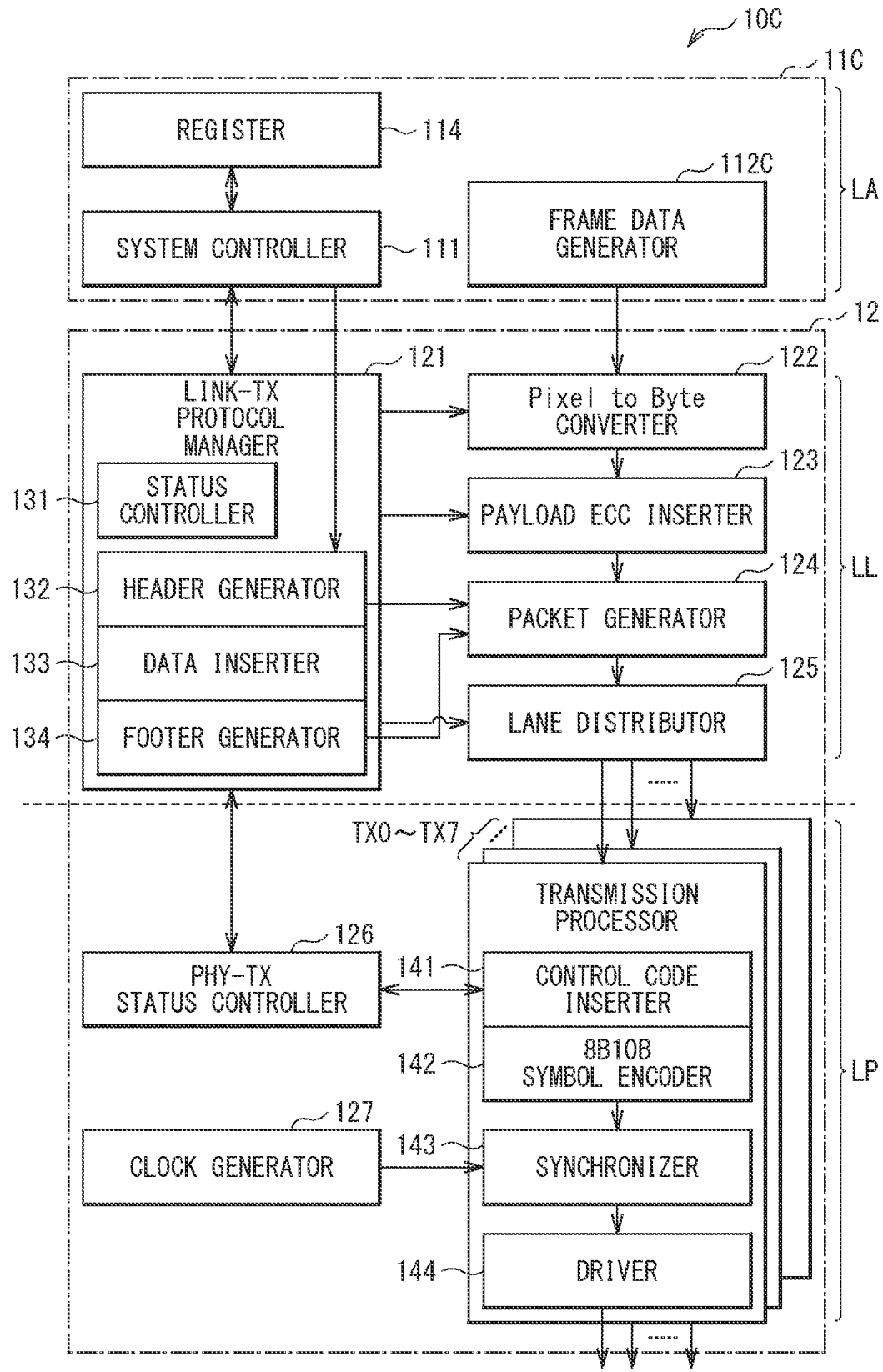

[FIG. 14]
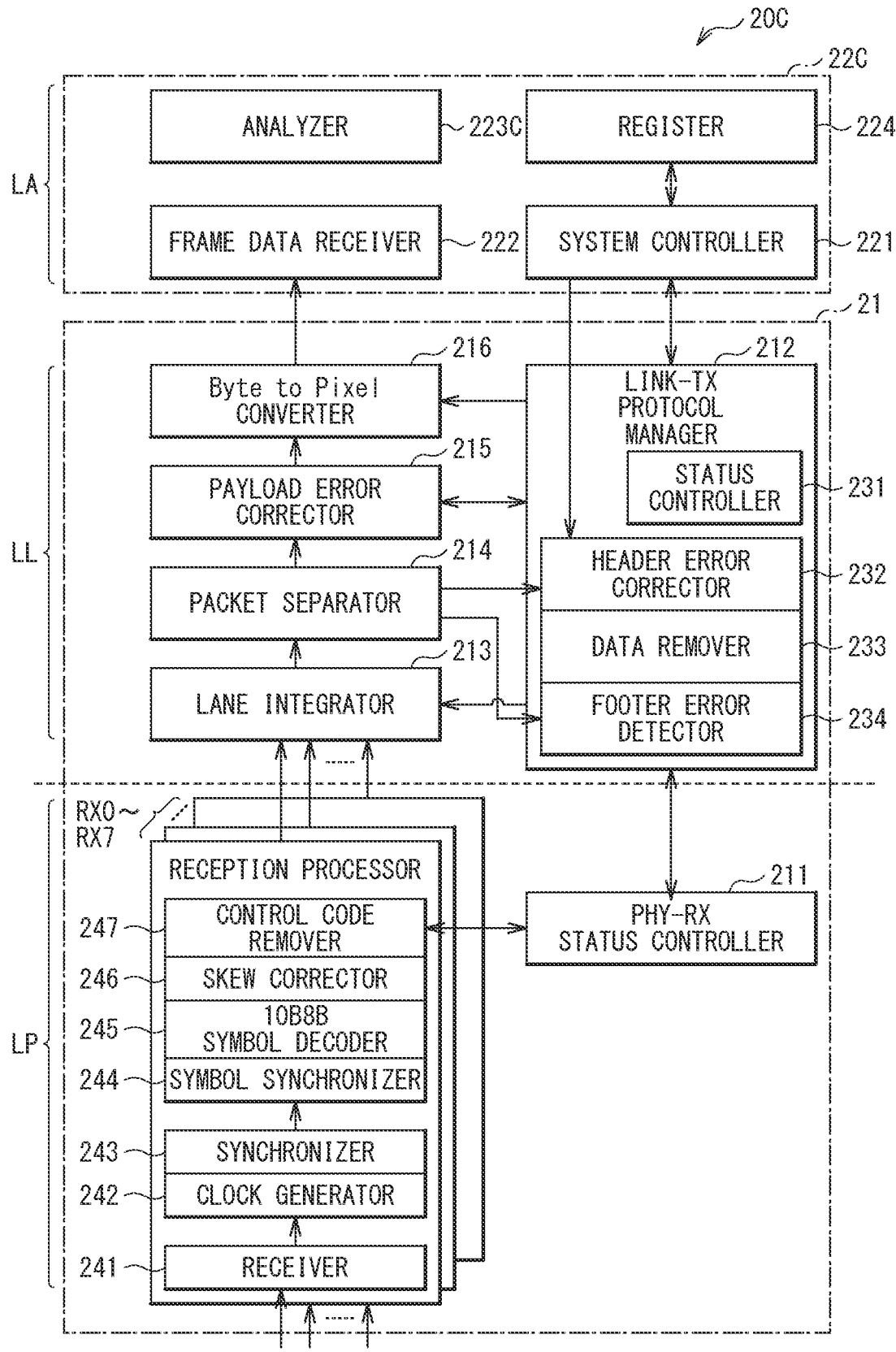

TRANSMISSION DEVICE, RECEPTION DEVICE, AND COMMUNICATION SYSTEM

TECHNICAL FIELD

The present disclosure relates to a transmission device that transmits image data, a reception device that receives image data, and a communication system that transmits and receives image data.

BACKGROUND ART

Some communication systems transmit and receive image data. PTL 1 discloses a communication system that generates packets, and transmits and receives image data by using the packets. The packet includes a header including control information and a payload including image data corresponding to one line.

CITATION LIST

Patent Literature

PTL 1: Japanese Unexamined Patent Application Publication No. 2012-120158

SUMMARY OF THE INVENTION

Incidentally, it is desired that a communication system make it easier to check whether or not communication is being performed correctly.

It is desirable to provide a transmission device, a reception device, and a communication system that make it possible to check whether or not communication is being performed correctly.

A transmission device according to one embodiment of the present disclosure includes a data generator and a transmission unit. The data generator is configured to generate image data including, as image information, pixel value information obtained by imaging pixels and control information. The transmission unit is configured to transmit the image data.

A reception device according to one embodiment of the present disclosure includes a reception unit and an analyzer. The reception unit is configured to receive image data including, as image information, pixel value information obtained by imaging pixels and control information. The analyzer is configured to perform analysis processing on the basis of the control information included in the image data.

A first communication system according to one embodiment of the present disclosure includes a transmission device and a reception device. The transmission device includes a data generator and a transmission unit. The data generator is configured to generate image data including, as image information, pixel value information obtained by imaging pixels and control information. The transmission unit is configured to transmit the image data. The reception device includes a reception unit and an analyzer. The reception unit is configured to receive the image data transmitted from the transmission device. The analyzer is configured to perform analysis processing on the basis of the control information included in the image data.

A second communication system according to one embodiment of the present disclosure includes a transmission device and a reception device. The transmission device includes a data generator, a transmission unit, and a control information transmission unit. The data generator is configured to generate image data including, as image information, pixel value information obtained by imaging pixels. The transmission unit is configured to transmit the image data. The control information transmission unit is configured to transmit control information. The reception device includes a reception unit, a control information reception unit, and an analyzer. The reception unit is configured to receive the image data transmitted from the transmission device. The control information reception unit is configured to receive the control information transmitted from the transmission device. The analyzer is configured to perform analysis processing on the basis of the control information.

In the transmission device, the reception device, and the first communication system according to one embodiment of the present disclosure, image data is generated, and the generated image data is transmitted. The image data includes, as image information, pixel value information obtained by the imaging pixels and control information.

In the second communication system according to one embodiment of the present disclosure, image data is generated, the generated image data is transmitted, and control information is transmitted. The image data includes, as image information, pixel value information obtained by the imaging pixels.

BRIEF DESCRIPTION OF DRAWINGS

FIG. 1 is a block diagram illustrating a configuration example of a communication system according to one embodiment of the present disclosure.

FIG. 2 is an explanatory diagram illustrating an example of a transmission format in the communication system illustrated in FIG. 1.

FIG. 3 is an explanatory diagram illustrating a configuration example of a packet in a normal mode.

FIG. 4 is an explanatory diagram illustrating a configuration example of a packet in a test mode, FIG. 5 is a block diagram illustrating a configuration example of an imaging device illustrated in FIG. 1.

FIG. 6 is a block diagram illustrating a configuration example of a processing device illustrated in FIG. 1.

FIG. 7 is an explanatory diagram illustrating an example of a region where header information is disposed in an image region.

FIG. 8 is a block diagram illustrating a configuration example of an imaging device according to a modification example.

FIG. 9 is an explanatory diagram illustrating a configuration example of a packet according to the modification example.

FIG. 10 is a block diagram illustrating a configuration example of a communication system according to another modification example.

FIG. 11 is a block diagram illustrating a configuration example of a processing device illustrated in FIG. 10.

FIG. 12 is a block diagram illustrating a configuration example of a communication system according to another modification example.

FIG. 13 is a block diagram illustrating a configuration example of an imaging device illustrated in FIG. 12.

FIG. 14 is a block diagram illustrating a configuration example of a processing device illustrated in FIG. 12.

MODES FOR CARRYING OUT THE INVENTION

In the following, embodiments of the present disclosure are described in detail with reference to the drawings.

Configuration Example

FIG. 1 illustrates a configuration example of a communication system (a communication system 1) according to one embodiment. The communication system 1 is configured to transmit and receive image data. The communication system 1 includes an imaging device 10 and a processing device 20. The imaging device 10 and the processing device 20 are provided in an electronic apparatus, such as a digital camera or a mobile phone, for example, and transmit and receive image data in the electronic apparatus.

The imaging device 10 is configured using a CMOS (complementary metal oxide semiconductor) image sensor, for example, and is configured to perform imaging operation. The imaging device 10 includes an imaging unit 11 and a transmission unit 12.

The imaging unit 11 is configured to generate image data by performing the imaging operation. The imaging unit 11 includes a plurality of imaging pixels. Each imaging pixel converts light received via a lens into an electric signal (pixel value information) by photoelectric conversion. In this manner, the imaging unit 11 is configured to generate image data.

The transmission unit 12 is configured to transmit the image data supplied from the imaging unit 11 to the processing device 20. Specifically, the transmission unit 12 transmits the image data to the processing device 20 by using a plurality of transmission lanes L (eight transmission lanes L0 to L7 in this example). In this example, each transmission lane L is configured by a differential transmission line.

The processing device 20 is configured using a digital signal processor, for example, and is configured to perform image processing on the image data transmitted from the imaging device 10. The processing device 20 includes a reception unit 21 and an image processing unit 22.

The reception unit 21 is configured to receive, from the imaging device 10, the image data transmitted via the plurality of transmission lanes L.

The image processing unit 22 is configured to perform various kinds of image processing on the basis of the image data received by the reception unit 21. For example, the image data is RAW data, and the image processing unit 22 performs various kinds of processing, such as image data compression processing, image display processing, and processing of recording the image data on a recording medium, for example.

The imaging device 10 has a normal mode MA and a test mode MB. In the normal mode MA, the imaging device 10 generates image data including, as image information, pixel value information obtained by the imaging pixels of the imaging unit 11, and transmits the image data to the processing device 20. In the test mode MB, the imaging device 10 generates image data including, as image information, the pixel value information obtained by the imaging pixels of the imaging unit 11 and control information (header information INFH to be described later), and transmits the image data to the processing device 20.

The transmission unit 12 of the imaging device 10 transmits the image data by transmitting packets P via the eight transmission lanes L0 to L7.

FIG. 2 illustrates an example of a transmission format in transmitting image data (frame data F) including image information corresponding to one frame by using the packets P. In FIG. 2, (A) illustrates the packet P, and (B) illustrates the transmission format.

As illustrated in (A) of FIG. 2, the packet P includes a header PH, a payload PR and a footer PF. The header PH, the payload PP, and the footer PF are disposed in this order in the packet P. The header PH includes control information. The control information of the header PH will be described later. The payload PP includes image information corresponding to one line. The footer PF includes control information. In this example, the control information of the footer PF includes a code (CRC code) for cyclic redundancy check (CRC; Cyclic Redundancy Check) for the image information corresponding to one line, for example. Note that, although the footer PF is provided in this example, the footer PF may not be provided. A control code ("Start Code" in this example) is disposed before the packet P, and a control code ("End Code" in this example) is disposed after the packet P.

The transmission unit 12 transmits image information included in an image data region A, as illustrated in (B) of FIG. 2. The image data region A includes an effective pixel region A1, a margin region A2, and dummy regions A3 and A4. The effective pixel region A1 is an image region corresponding to a region where so-called effective pixels are arranged in the imaging unit 11. The margin region A2 is disposed on the left of the effective pixel region A1. In this example, the number of pixels in an up-down direction (vertical direction) in the margin region A2 is the same as the number of pixels in the up-down direction in the effective pixel region A1. The dummy region A3 is disposed above the effective pixel region A1. In this example, the number of pixels in a left-right direction (horizontal direction) in the dummy region A3 is the same as the sum of the number of pixels in the left-right direction in the effective pixel region A1 and the number of pixels in the left-right direction in the margin region A2. In this example, "Embedded Data" is inserted in the dummy region A3. This "Embedded Data" includes information about setting values of the imaging operation in the imaging unit 11, such as a shutter speed, aperture_ and gain. The dummy region A4 is disposed below the effective pixel region A1. In this example, the number of pixels in the left-right direction (horizontal direction) in the dummy region M is the same as the sum of the number of pixels in the left-right direction in the effective pixel region A1 and the number of pixels in the left-right direction in the margin region A2. "Embedded Data" is inserted in the dummy region A3 in this example, but is not limited thereto. For example, "Embedded Data" may be inserted in the dummy region A4.

One packet P includes image information corresponding to one line in the image data region A. Thus, the transmission unit 12 is able to transmit image information in the image data region A, by using the same number of packets P as the number of pixels in the up-down direction in the image data region A. In this manner, the communication system 1 transmits, line by line, the image information corresponding to one frame. This enables the communication system 1 to transmit additional information, such as the header PH and the footer PF, and control codes, such as "Start Code" and "End Code", in a horizontal blanking period in the imaging operation.

FIG. 3 illustrates a configuration example of the packet P in the normal mode MA. The packet P includes a header PH, a payload PP (payload PPA), and a footer PF.

The header PH of the packet P includes control information. The control information includes "Frame Start", "Frame End", "Line Valid", "Line Number", "Reserved", and "Header ECC", "Frame Start", "Frame End", "Line Valid", "Line Number", and "Reserved" configure control data D.

"Frame Start" is 1-bit flag information indicating the start of a frame. As illustrated in FIG. 2, "Frame Start" is set to "1" in the header PH of the packet P corresponding to the first line in the image data region A, and "Frame Start" is set to "0" in the header PH of the packet P corresponding to each of the other lines in the image data region A.

"Frame End" is 1-bit flag information indicating the end of a frame. As illustrated in FIG. 2, "Frame End" is set to "1" in the header PH of the packet P corresponding to the last line in the effective pixel region A1, and "Frame End" is set to "0" in the header PH of the packet P corresponding to each of the other lines in the image data region A.

"Line Valid" is 1-bit flag information indicating whether or not the image information corresponding to one line and included in the payload PP is image information in the effective pixel region A1. As illustrated in FIG. 2, "Line Valid" is set to "1" in the header PH of the packet P corresponding to each line in the effective pixel region A1, and "Line Valid" is set to "0" in the header PH of the packet P corresponding to each of the other lines in the image data region A.

"Line Number" is 13-bit information indicating a line number, in the image data region A, of the image information corresponding to one line and included in the payload PP.

"Reserved" is 32-bit information usable for function extension.

The control data D is configured using these "Frame Start", "Frame End", "Line Valid" "Line Number", and "Reserved". An amount of information of the control data D is 6 bytes.

"Header ECC" is an error correction code (ECC; Error Collection Code) of the control data D. An amount of information of "Header ECC" is 18 bytes. "Header ECC" includes "CRC". "CRC" is a code (CRC code) for cyclic redundancy check for the control data D. An amount of information of "CRC" is 2 bytes. That is, the sum of the amounts of information of the control data D and "CRC" is 8 bytes. "Header ECC" further includes two sets of the control data D and the CRC code. Thus, the header PH includes three sets of the control data D and the CRC code.

The payload PPA includes image information corresponding to one line. In the normal mode MA, the payload PPA includes, as the image information, the pixel value information obtained by the imaging pixels.

FIG. 4 illustrates a configuration example of the packet P in the test Mode MB. The packet P includes a header PH, a payload PP (payload PPB), and a footer PF.

The payload PPB includes image information corresponding to one line. In the test mode MB, the payload PPB includes, as the image information, the pixel value information obtained by the imaging pixels and the header information INFH. The header information INFH includes a portion or all of the information included in the header PH. In this example, the header information INFH includes the same information as the control data D included in the header PH. The header information INFH is disposed at a position, in the payload PPB, corresponding to the image information of the effective pixel region A1.

Thus, in the normal mode MA, the imaging device 10 of the communication system 1 transmits, to the processing device 20, the image data (frame data F) including the pixel value information obtained by the imaging pixels as the image information. The image processing unit 22 of the processing device 20 performs image processing on the basis of the image data.

Further, in the test mode MB, the imaging device 10 of the communication system 1 transmits, to the processing device 20, the image data (frame data F) including, as the image information, the pixel value information obtained by the imaging pixels and the header information INFH. The image processing unit 22 of the processing device 20 performs image processing on the basis of the image data. At that time, the image processing unit 22 is able to analyze whether or not communication is being performed correctly, for example, on the basis of the header information INFH included in the image data.

(Imaging Device 10)

FIG. 5 illustrates a configuration example of the imaging device 10. FIG. 5 illustrates a configuration of an application layer LA, a link layer LL, and a physical layer LP in the imaging device 10.

The imaging device 10 includes a system controller 111, a frame data generator 112, and a register 114 in the application layer LA. In this example, the system controller 111, the frame data generator 112, and the register 114 are implemented by the imaging unit 11.

The system controller 111 is configured to control the communication in the communication system 1, by supplying various information necessary for the communication in the communication system 1, such as information about a frame format, to a LINK-TX protocol manager 121 (described later) of the transmission unit 12.

The frame data generator 112 is configured to generate image data (frame data F) on the basis of pixel value information obtained by the imaging pixels of the imaging unit 11. The frame data generator 112 includes a header information generator 113. The header information generator 113 is configured to generate header information INFH in the test mode MB.

In the normal mode MA, the frame data generator 112 generates the frame data. F including, as the image information, the pixel value information obtained by the imaging pixels of the imaging unit 11. Further, in the test mode MB, the frame data generator 112 generates the frame data F including, as the image information, the pixel value information obtained by the imaging pixels of the imaging unit 11 and the header information INFH generated by the header information generator 113. The frame data generator 112 generates the frame data F by disposing the header information INFH at a position corresponding to the image information of the effective pixel region A1.

The register 114 stores, for example, various setting values related to the transmission of image data, such as information about the number of bits of Pixel to Byte conversion to be performed in a Pixel to Byte converter 122 (described later), and information about the transmission lane L to be used among the plurality of transmission lanes L. In addition, the register 114 stores information indicating which of the normal mode MA and the test mode MB the operation mode of the imaging device 10 is. The transmission unit 12 performs processing of transmitting the frame data F, on the basis of the information stored in the register 114.

The transmission unit 12 includes the LINK-TX protocol manager 121, the Pixel to Byte converter 122, a payload ECC inserter 123, a packet generator 124, and a lane distributor 125 in the link layer LL. The LINK-TX protocol manager 121 includes a status controller 131, a header generator 132, a data inserter 133, and a footer generator 134.

The status controller 131 of the LINK-TX protocol manager 121 is configured to manage an operation status of the link layer LL in the transmission unit 12.

The header generator 132 is configured to generate the header PH to be added to the payload PP, and to supply the generated header PH to the packet generator 124. Specifically, the header generator 132 generates the header PH including the control data D and "Header ECC", which is an error correction code of the control data D, as illustrated in FIGS. 3 and 4.

The data inserter 133 is configured to generate payload stuffing data and lane stuffing data to be used for stuffing (stuffing). The payload stuffing data is used in adjusting an amount of data of the payload PP. The lane stuffing data is used in adjusting an amount of data transmitted by the transmission lane L between the transmission lanes L. Then, the data inserter 133 supplies the generated payload stuffing data to the Pixel to Byte converter 122, and supplies the generated lane stuffing data to the lane distributor 125.

The footer generator 134 is configured to generate the footer PF to be added to the payload PP, and to supply the generated footer PF to the packet generator 124. Specifically, the footer generator 134 generates the footer PF including a code (CRC code) for cyclic redundancy check for the image information corresponding to one line and included in the payload PP.

The Pixel to Byte converter 122 is configured to perform Pixel to Byte conversion that converts the image information included in the frame data generated by the frame data generator 112 into 1-byte-unit data. The image information is represented in, for example, 8-bit units, 10-bit units, 12-bit units, 14-bit units, 16-bit units, etc. The Pixel to Byte converter 122 converts such image information into 1-byte-unit data.

Further, the Pixel to Byte converter 122 also performs processing of adjusting the amount of data to be included in the payload PP, by using the payload stuffing data supplied from the data inserter 133. In this manner, the Pixel to Byte converter 122 generates the payload PP.

The payload ECC inserter 123 is configured to calculate an error correction code of the payload PP generated by the Pixel to Byte converter 122, insert the error correction code into the payload PP, and supply the payload PP into which the error correction code has been inserted to the packet generator 124. Note that the payload ECC inserter 123 may not perform the insertion of the error correction code into the payload PP. In this case, the payload ECC inserter 123 supplies the payload PP generated by the Pixel to Byte converter 122 to the packet generator 124 as it is.

The packet generator 124 is configured to generate the packet P, by adding the header PH supplied from the header generator 132 before the payload PP and adding the footer PF supplied from the footer generator 134 after the payload PP.

The lane distributor 125 is configured to assign, in a predetermined order, the packets P generated by the packet generator 124 to the transmission lanes L to be used among the transmission lanes L0 to L7. Further, the lane distributor 125 also performs processing of adjusting the amount of data transmitted by the transmission lane L between the transmission lanes L, by using the lane stuffing data supplied from the data inserter 133. Then, the lane distributor 125 supplies the packet P to a transmission processor TX corresponding to the transmission lane L assigned with the packet P, among eight transmission processors TX (described later).

The transmission unit 12 includes a PHY-TX status controller 126, a clock generator 127, and the eight transmission processors TX (transmission processors TX0 to TX7) in the physical layer LP. The eight transmission processors TX are provided to correspond respectively to the eight transmission lanes L. Each of the eight transmission processors TX includes a control code inserter 141, an 8B10B symbol encoder 142, a synchronizer 143, and a driver 144.

The PHY-TX status controller 126 is configured to control the processing of the eight transmission processors TX. Specifically, for example, the PHY-TX status controller 126 controls timings of the processing in the eight transmission processors TX.

The clock generator 127 is configured to generate a clock signal, and supply the clock signal to the synchronizer 143 of each of the eight transmission processors TX.

In each of the eight transmission processors TX, the control code inserter 141 is configured to insert, for example, control codes such as "Idle Code", "Start Code", "End Code", "Pad Code", "Sync Code", "Deskew Code", and "Standby Code", into data including the packet P and supplied from the lane distributor 125. "Idle Code" is a control code that is used repeatedly during a period in which the packet P is not transmitted. "Start Code" is a control code indicating the start of the packet P, and is added before the packet P, as illustrated in (A) of FIG. 2. "End Code" is a control code indicating the end of the packet P, and is added after the packet P, as illustrated in (A) of FIG. 2. "Pad Code" is a control code that is inserted inside the payload PP to fill a difference between a transmission rate of the data supplied from the imaging unit 11 and a transmission rate of the data transmitted by the transmission unit 12. "Sync Code" is a control code that is used to implement bit synchronization and symbol synchronization in the communication. "Deskew Code" is a control code that is used to correct a discrepancy between reception timings of the data received by the reception unit 21 via the plurality of transmission lanes L. "Standby Code" is a control code that is used to notify the transmission unit 12 that the transmission unit 12 ends the transmission of the packet P and enters a standby status. The control code inserter 141 inserts such control codes into the data including the packet P and supplied from the lane distributor 125.

The 8B10B symbol encoder 142 is configured to convert 8-bit-unit data into 10-bit-unit data, by performing 8B10B conversion on the basis of the data into which the control codes have been inserted in the control code inserter 141.

The synchronizer 143 is configured to supply each bit of the data subjected to the 8B10B conversion to the driver 144 on the basis of the clock signal supplied from the clock generator 127.

The driver 144 is configured to transmit the data supplied from the synchronizer 143 to the processing device 20, via the transmission lane L corresponding to the transmission processor TX including the driver 144, (Processing Device 20)

FIG. 6 illustrates a configuration example of the processing device 20. FIG. 6 illustrates a configuration of the application layer LA, the link layer LL, and the physical layer LP in the processing device 20.

The processing device 20 includes a system controller 221, a frame data receiver 222, an analyzer 223, and a register 224 in the application layer LA. In this example, the system controller 221, the frame data receiver 222, the analyzer 223, and the register 224 are implemented by the image processing unit 22.

The system controller 221 is configured to control a sequence, etc. of a mode change, etc. in a LINK-RX protocol manager 212 (described later) of the reception unit 21.

The frame data receiver 222 is configured to generate the image data (frame data F) including the image information corresponding to one frame, on the basis of the image information of the lines supplied from the reception unit 21. The image processing unit 22 performs various kinds of image processing on the basis of the frame data F.

The analyzer 223 is configured to analyze, in the test mode MB, whether or not communication is being performed correctly on the basis of the header information INFH included in the frame data F generated by the frame data receiver 222.

The register 224 stores, for example, various setting values related to the reception of image data, such as the number of bits of Byte to Pixel conversion to be performed in a Byte to Pixel converter 216 (described later), and information about the transmission lane L to be used among the plurality of transmission lanes L. The reception unit 21 performs processing of receiving the frame data F, on the basis of the information stored in the register 224.

The reception unit 21 of the processing device 20 includes a PHY-RX status controller 211 and eight reception processors RX (reception processors RX0 to RX7) in the physical layer LP. The eight reception processors RX are provided to correspond respectively to the eight transmission lanes L. Each of the eight reception processors RX includes a receiver 241, a clock generator 242, a synchronizer 243, a symbol synchronizer 244, a 10B8B symbol decoder 245, a skew corrector 246, and a control code remover 247.

The PHY-RX status controller 211 is configured to control the processing of the eight reception processors RX.

In each of the eight reception processors RX, the receiver 241 is configured to receive, from the imaging device 10, the data transmitted via the transmission lane L corresponding to the reception processor RX including the receiver 241.

The clock generator 242 is configured to perform bit synchronization by detecting transition of the data received by the receiver 241, and to generate a clock signal on the basis of a detection cycle of the transition.

The synchronizer 243 is configured to sample the data received by the receiver 241, on the basis of the clock signal generated by the clock generator 24. The clock generator 242 and the synchronizer 243 implement a CDR (Clock and Data Recovery) function.

The symbol synchronizer 244 is configured to perform symbol synchronization by detecting a control code included in the data sampled by the synchronizer 243. Specifically, the symbol synchronizer 244 is able to perform the symbol synchronization by detecting, for example, "Start Code", "End Code", "Deskew Code", and "Sync Code".

The 10B8B symbol decoder 245 is configured to convert 10-bit-unit data into 8-bit-unit data, by performing 10B8B conversion on the basis of the data subjected to the symbol synchronization in the symbol synchronizer 244.

The skew corrector 246 is configured to correct skew between the transmission lanes L, by detecting "Deskew Code" included in the data subjected to the 10B8B conversion, and matching the timing of "Deskew Code" with the timing indicated by the PHY-RX status controller 211. Specifically, the skew corrector 246 corrects the skew by matching the timing of "Deskew Code" with the latest detection timing of the detection timings of "Deskew Code" in the eight reception processors RX, on the basis of an instruction from the PHY-RX status controller 211.

The control code remover 247 is configured to remove control codes from the data whose skew has been corrected by the skew corrector 246, and to supply a portion of the data sandwiched between "Start Code" and "End Code", as the packet P, to a lane integrator 213.

The reception unit 21 includes the LINK-RX protocol manager 212, the lane integrator 213, a packet separator 214, a payload error corrector 215, and the Byte to Pixel converter 216 in the link layer LL. The LINK-RX protocol manager 212 includes a status controller 231, a header error corrector 232, a data remover 233, and a footer error detector 234.

The status controller 231 of the LINK-RX protocol manager 212 is configured to manage the operation status of the link layer LL in the reception unit 21.

The header error corrector 232 is configured to acquire three sets of control data D and a CRC code on the basis of the header PH separated by the packet separator 214, and to perform error detection calculation for the control data D in each set. Then, the header error corrector 232 supplies the control data D of an error-free set, among the three sets, to the register 224, and causes the register 224 to store the control data D.

The data remover 233 is configured to control the operation of the lane integrator 213 to cause the lane integrator 213 to remove the lane stuffing data, and to control the operation of the Byte to Pixel converter 216 to cause the Byte to Pixel converter 216 to remove the payload stuffing data.

The footer error detector 234 performs error detection calculation by using the CRC code included in the footer PF separated by the packet separator 214, and detects an error of the payload PP on the basis of a result of the calculation. The footer error detector 234 supplies the error detection result to the register 224, and causes the register 224 to store the error detection result.

The lane integrator 213 is configured to arrange the plurality of packets P supplied from the eight reception processors RX in an order opposite to the order of the distribution by the lane distributor 125. Further, the lane integrator 213 also performs processing of removing the lane stuffing data on the basis an instruction from the data remover 233. Then, the lane integrator 213 sequentially supplies the processed packets P to the packet separator 214.

The packet separator 214 is configured to separate the header PH, the payload. PP, and the footer PF included in the packet P supplied from the lane integrator 213. The packet separator 214 supplies the header PH to the header error corrector 232, and supplies the footer PF to the footer error detector 234.

The payload error corrector 215 is configured to, in a case where an error correction code is inserted in the payload PP separated by the packet separator 214, detect an error of the payload PP and correct the detected error, by performing error correction calculation on the basis of the error correction code. Then, the payload error corrector 215 supplies the processed payload PP to the Byte to Pixel converter 216. Further, in a case where an error correction code is not inserted in the payload PP, the payload error corrector 215 supplies the payload PP to the Byte to Pixel converter 216 as it is.

The Byte to Pixel converter 216 is configured to remove the payload stuffing data from the payload PP supplied from the payload error corrector 215, and perform Byte to Pixel conversion that converts the data from which the payload stuffing data has been removed into image information. This Byte to Pixel conversion is an inverse conversion of the Pixel to Byte conversion performed by the Pixel to Byte converter 122 of the transmission unit 12. This generates, for example, image information in 8-bit units, 10-bit units, 12-bit units, 14-bit units, 16-bit units, etc.

In the image processing unit 22, the frame data receiver 222 generates the image data corresponding to one frame (frame data F), by identifying image information of a plurality of lines corresponding to the effective pixel region A1, of the image information supplied from the Byte to Pixel converter 216, on the basis of "Line Valid" included in the control data D stored in the register 224, and arranging the image information of the lines in an order corresponding to "Line Number" included in the control data D.

Here, the imaging device 10 corresponds to a specific example of a "transmission device" in the present disclosure. The frame data generator 112 corresponds to a specific example of a "data generator" in the present disclosure. The transmission unit 12 corresponds to a specific example of a "transmission unit" in the present disclosure. The frame data F corresponds to a specific example of "image data" in the present disclosure. The header information INFH corresponds to a specific example of "control information" in the present disclosure. The control data D corresponds to a specific example of "control data" in the present disclosure. The test mode MB corresponds to a specific example of a "first mode" in the present disclosure. The normal mode MA corresponds to a specific example of a "second mode" in the present disclosure.

The processing device 20 corresponds to a specific example of a "reception device" in the present disclosure. The reception unit 21 corresponds to a specific example of a "reception unit" in the present disclosure. The analyzer 223 corresponds to a specific example of an "analyzer" in the present disclosure.

[Operation and Workings]

Now, operation and workings of the communication system 1 according to the present embodiment will be described.

(Overview of Overall Operation)

First, referring to FIG. 1, an overview of the overall operation of the communication system 1 will be described. The imaging device 10 generates image data by performing imaging operation. Specifically, in the normal mode MA, the imaging device 10 generates the image data (frame data F) including the pixel value information obtained by the imaging pixels as the image information. In addition, in the test mode MB, the imaging device 10 generates the image data (frame data F) including, as the image information, the pixel value information obtained by the imaging pixels and the header information INFH. Then, the imaging device 10 transmits the image data to the processing device 20 via the plurality of transmission lanes L.

The processing device 20 receives, from the imaging device 10, the image data transmitted via the plurality of transmission lanes L, and performs various kinds of image processing on the basis of the image data. Further, in the test mode MB, the processing device 20 analyzes whether or not communication is being performed correctly, on the basis of the header information INFH included in the image data (frame data F).

(Detailed Operation)

Next, the operation of the communication system 1 will be described in detail.

In the imaging device 10 (FIG. 5), in the normal mode MA, the frame data generator 112 generates the frame data F including, as the image information, the pixel value information obtained by the imaging pixels of the imaging unit 11. Further, in the test mode MB, the frame data generator 112 generates the frame data F including, as the image information, the pixel value information obtained by the imaging pixels of the imaging unit 11 and the header information INFH generated by the header information generator 113. The frame data generator 112 generates the frame data F by disposing the header information INFH at a position corresponding to the image information of the effective pixel region A1.

The Pixel to Byte converter 122 performs Pixel to Byte conversion that converts the image information included in the frame data generated by the frame data generator 112 into 1-byte-unit data. Further, the Pixel to Byte converter 122 also performs the processing of adjusting the amount of data to be included in the payload PP, by using the payload stuffing data supplied from the data inserter 133. In this manner, the Pixel to Byte converter 122 generates the payload PP.

The payload ECC inserter 123 calculates an error correction code of the payload PP generated by the Pixel to Byte converter 122, inserts the error correction code into the payload PP, and supplies the payload PP into which the error correction code has been inserted to the packet generator 124.

The packet generator 124 generates the packet P, by adding the header PH supplied from the header generator 132 before the payload PP and adding the footer PF supplied from the footer generator 134 after the payload PP.

In the normal mode MA, the packet P is configured as illustrated in FIG. 3. The payload PPA of this packet P includes the pixel value information obtained by the imaging pixels as the image information.

In the test mode MB, the packet P is configured as illustrated in FIG. 4. The payload PPB of this packet P includes, as the image information, the pixel value information obtained by the imaging pixels and the header information INFH. The header information INFH is located at a position, in the payload PPB, corresponding to the image information of the effective pixel region A1.

The lane distributor 125 assigns, in a predetermined order, the packets P generated by the packet generator 124 to the transmission lanes L to be used among the transmission lanes L0 to L7. Further, the lane distributor 125 adjusts the amount of data transmitted by the transmission lane L between the transmission lanes L, by using the lane stuffing data supplied from the data inserter 133. Then, the lane distributor 125 supplies the packet P to the transmission processor TX corresponding to the transmission lane L assigned with the packet P, among the eight transmission processors TX.

In each of the eight transmission processors TX, the control code inserter 141 inserts, for example, control codes such as "Idle Code", "Start Code", "End Code", "Pad Code" "Sync Code", "Deskew Code", and "Standby Code", into data including the packet P and supplied from the lane distributor 125. The 8B10B symbol encoder 142 converts 8-bit-unit data into 10-bit-unit data, by performing 8B10B conversion on the basis of the data into which the control codes have been inserted in the control code inserter 141. The synchronizer 143 supplies each bit of the data subjected to the 8B10B conversion to the driver 144 on the basis of the clock signal supplied from the clock generator 127. The driver 144 transmits the data supplied from the synchronizer 143 to the processing device 20, via the transmission lane L corresponding to the transmission processor TX including the driver 144.

In the processing device 20 (FIG. 6), in each of the eight reception processors RX, the receiver 241 receives, from the imaging device 10, the data transmitted via the transmission lane L corresponding to the reception processor RX including the receiver 241. The clock generator 242 performs bit synchronization by detecting transition of the data received by the receiver 241, and generates a clock signal on the basis of a detection cycle of the transition. The synchronizer 243 samples the data received by the receiver 241, on the basis of the clock signal generated by the clock generator 24. The symbol synchronizer 244 performs symbol synchronization by detecting a control code included in the data sampled by the synchronizer 243. The 10B8B symbol decoder 245 converts 10-bit-unit data into 8-bit-unit data, by performing 10B8B conversion on the basis of the data subjected to the symbol synchronization in the symbol synchronizer 244. The skew corrector 246 corrects skew between the transmission lanes L, by detecting "Deskew Code" included in the data subjected to the 10B8B conversion, and matching the timing of "Deskew Code" with the timing indicated by the PHY-RX status controller 211. The control code remover 247 removes control codes from the data whose skew has been corrected by the skew corrector 246, and supplies a portion of the data sandwiched between "Start Code" and "End Code", as the packet P, to the lane integrator 213.

The lane integrator 213 arranges the plurality of packets P supplied from the eight reception processors RX in an order opposite to the order of the distribution by the lane distributor 125, and removes the lane stuffing data on the basis of an instruction from the data remover 233. Then, the lane integrator 213 sequentially supplies the processed packets P to the packet separator 214.

The packet separator 214 separates the header PH, the payload PP, and the footer PF included in the packet P supplied from the lane integrator 213. Then, the packet separator 214 supplies the header PH to the header error corrector 232, and supplies the footer PF to the footer error detector 234.

The header error corrector 232 acquires three sets of control data D and a CRC code on the basis of the header PH separated by the packet separator 214, and performs error detection calculation for the control data D in each set. Then, the header error corrector 232 supplies the control data D of an error-free set, among the three sets, to the register 224, and causes the register 224 to store the control data D.

The footer error detector 234 performs error detection calculation by using the CRC code included in the footer PF separated by the packet separator 214, and detects an error of the payload PP on the basis of a result of the calculation. Then, the footer error detector 234 supplies the error detection result to the register 224, and causes the register 224 to store the error detection result.

In a case where an error correction code is inserted in the payload PP separated by the packet separator 214, the payload error corrector 215 detects an error of the payload PP and corrects the detected error, by performing error correction calculation on the basis of the error correction code. Then, the payload error corrector 215 supplies the processed payload. PP to the Byte to Pixel converter 216.

The Byte to Pixel converter 216 removes the payload stuffing data from the payload PP supplied from the payload error corrector 215, and performs Byte to Pixel conversion that converts the data from which the payload stuffing data has been removed into image information.

In the image processing unit 22, the frame data receiver 222 generates the image data corresponding to one frame (frame data F), by identifying image information of a plurality of lines corresponding to the effective pixel region A1, of the image information supplied from the Byte to Pixel converter 216, on the basis of "Line Valid" included in the control data D stored in the register 224, and arranging the image information of the lines in an order corresponding to "Line Number" included in the control data D. The image processing unit 22 performs various kinds of image processing on the basis of the frame data F. Specifically, the image processing unit 22 performs various kinds of processing, such as image data compression processing, image display processing, and processing of recording the image data on a recording medium, for example.

In the test mode MB, the analyzer 223 analyzes whether or not communication is being performed correctly on the basis of the header information INFH included in the frame data F generated by the frame data receiver 222.

FIG. 7 illustrates the position where the header information INFH is disposed in an image region W indicated by the frame data F generated by the frame data receiver 222 in the test mode MB. The image region W corresponds to the effective pixel region A1. In this example, the header information INFH is disposed in a left region W1 in the region of the image region W.

In this manner, in the communication system 1, in the test node MB, the frame data generator 112 of the imaging device 10 generates the frame data. F including, as the image information, the pixel value information obtained by the imaging pixels of the imaging unit 11 and the header information INFH generated by the header information generator 113. Then, the transmission unit 12 generates the payload PPB including, as the image information, the pixel value information obtained by the imaging pixels of the imaging unit 11 and the header information INFH. Thus, in the processing device 20 that receives the frame data F, it is possible to analyze whether or not communication is being performed correctly.

That is, in the normal mode MA, for example, the frame data generator 112 of the imaging device 10 generates the frame data F including, as the image information, the pixel value information obtained by the imaging pixels of the imaging unit 11. Then, the transmission unit 12 generates the payload PP on the basis of the frame data F, and generates the packet P by adding the header PH and the footer PF to the payload PP. In the reception unit 21 of the processing device 20, the packet separator 214 separates the header PH, the payload PP, and the footer PI' included in the packet P, and the payload error corrector 215 and the Byte to Pixel converter 216 continue processing on the basis of the payload PP. Then, the frame data receiver 222 generates the frame data F on the basis of the image information supplied from the Byte to Pixel converter 216 and the control data D stored in the register 224. The frame data F thus generated does not include information about the header PH, which makes it difficult to analyze whether or not the reception processing has been performed correctly on the basis of the frame data F, for example.

Hence, the test mode MB is provided in the communication system 1, and in the test mode MB, the frame data generator 112 of the imaging device 10 generates the frame data F including, as the image information, the pixel value information obtained by the imaging pixels of the imaging unit 11 and the header information INFH generated by the header information generator 113. Thus, the frame data F generated by the frame data receiver 22 of the processing device 20 also includes the header information INFH. This enables the analyzer 223 to use the header information INFH to analyze whether or not the reception processing in the reception unit 21 has been performed correctly.

[Effects]

In the present embodiment as described above, in the test mode, the frame data including, as the image information, the pixel value information obtained by the imaging pixels and the header information is generated. This makes it possible to analyze whether or not communication is being performed correctly.

Modification Example 1

In the above embodiment, in the test mode MB, the frame data F including, as the image information, the pixel value information obtained by the imaging pixels and the header information INFH including the same information as the information included in the header PH is generated, but the present disclosure is not limited thereto. Alternatively, for example, in the test mode MB, the frame data F including, as the image information, the pixel value information obtained by the imaging pixels and footer information INFF including the same information as the information included in the footer PF may be generated. A communication system 1A according to the present modification example is described in detail below.

The communication system 1A includes an imaging device 10A and a processing device 20A, as with the communication system 1 according to the above embodiment (FIG. 1).

FIG. 8 illustrates a configuration example of the imaging device 10A. The imaging device 10A includes an imaging unit 11A. The imaging unit 11A includes a frame data generator 112A. The frame data generator 112A includes a footer information generator 113A. The footer information generator 113A is configured to generate the footer information INFF in the test mode MB. The footer information INFF includes a portion or all of the information included in the footer PF. Specifically, the footer information INFF includes, for example, a CRC code for image information corresponding to one line.

In the normal mode MA, the frame data generator 112A generates the frame data F including the pixel value information obtained by the imaging pixels of the imaging unit 11 as the image information. Further in the test mode MB, the frame data generator 112A generates the frame data F including, as the image information, the pixel value information obtained by the imaging pixels of the imaging unit 11 and the footer information INFF generated by the footer information generator 113A. The frame data generator 112A generates the frame data F by disposing the footer information INFF at a position corresponding to the image information of the effective pixel region A1.

FIG. 9 illustrates a configuration example of the packet P in the test mode MB. The packet P includes a header PH, a payload PP (payload PPB), and a footer PF. The payload PPB includes image information corresponding to one line. In the test mode MB, the payload PPB includes, as the image information, the pixel value information obtained by the imaging pixels and the footer information INFF. The footer information INFF is disposed at a position, in the payload PPB, corresponding to the image information of the effective pixel region A1.

The processing device 20A includes an image processing unit 22A, as with the processing device 20 according to the above embodiment (FIGS. 1 and 6). The image processing unit 22A includes an analyzer 223A. In the test mode MB, the analyzer 223A analyzes whether or not communication is being performed correctly on the basis of the footer information INFF included in the frame data F generated by the frame data receiver 222.

Note that, in the test mode MB, the frame data F including, as the image information, the pixel value information obtained by the imaging pixels and the footer information INFF is generated in this example, but the present disclosure is not limited thereto. For example, in the test mode MB, the frame data F including, as the image information, the pixel value information obtained by the imaging pixels, the header information INFH, and the footer information INFF may be generated. In this case, the payload PPB includes, as the image information, the pixel value information obtained by the imaging pixels, the header information INFH, and the footer information INFF.

Modification Example 2

In the above embodiment, in the test mode MB, the frame data. F including, as the image information, the pixel value information obtained by the imaging pixels and the header information INFH is generated, but the present disclosure is not limited thereto. For example, the frame data F further including, as the image information, "Embedded Data" included in the dummy region A3 in addition to the pixel value information and the header information INFH may be generated. In this case, the payload. PPB includes the pixel value information obtained by the imaging pixels, the header information INFH, and "Embedded Data" as the image information.

Modification Example 3

In the above embodiment, the header information INFH provided in the payload PP includes the control data D, but the present disclosure is not limited thereto. Alternatively, for example, the header information INFH may include the control data D and "Header ECC", which is an error correction code of the control data D.

Modification Example 4

In the above embodiment, the normal mode MA and the test mode MB are provided. The header generator 132 of the transmission unit 12 may generate the header PH including flag information indicating which of the normal mode MA and the test mode MB the mode is. For example, "Reserved" in the control data D of the header PH may include this flag information. Thus, for example, it is possible for the system controller 221 of the processing device 20 to know which of the normal mode MA and the test mode MB the operation mode of the imaging device 10 is, on the basis of the control data D stored in the register 224.

Note that the present disclosure is not limited thereto. For example, a control line that exchanges control signals may be provided, separately from the eight transmission lanes L0 to L7, in the communication system 1, and the processing device 20 may be notified of information about the operation mode of the imaging device 10 stored in the register 114.

Modification Example 5

In the above embodiment, the normal mode MA and the test mode MB are provided, but the present disclosure is not limited thereto. For example, without providing these operation modes, the frame data generator 112 may constantly generate the frame data F including, as the image information, the pixel value information obtained by the imaging pixels and the header information INFH including the same information as the information included in the header PH. In this case, it is possible for the analyzer 223 of the processing device 20 to constantly analyze whether or not communication is being performed correctly on the basis of the footer information INFF included in the frame data F generated by the frame data receiver 222.

Modification Example 6

Further, the reception unit 21 may perform check processing of checking that the header information INFH is correct, by comparing the header information INFH included in the payload PP with the information indicated by the header PH, and checking whether or not the information indicated by the header PH and the header information INFH match each other. Specifically, the PHY-RX status controller 211 of the reception unit 21 may perform this check processing, or the LINK-RX protocol manager 212 may perform this check processing.

Modification Example 7

In the above embodiment, in the test mode MB, the frame data generator 112 generates the frame data F including, as the image information, the pixel value information obtained by the imaging pixels of the imaging unit 11 and the header information INFH generated by the header information generator 113, but the present disclosure is not limited thereto. Alternatively, in the test mode MB, the frame data generator 112 may acquire the header information INFH generated by the header generator 132 of the LINK-TX protocol manager 121, and generate the frame data F including, as the image information, the pixel value information obtained by the imaging pixels of the imaging unit 11 and this header information MFR.

Similarly, in the imaging device 10A according to the modification example 1, in the test mode MB, the frame data generator 112A generates the frame data F including, as the image information, the pixel value information obtained by the imaging pixels of the imaging unit 11 and the footer information INFF generated by the footer information generator 113A, but the present disclosure is not limited thereto. Alternatively, in the test mode MB, the frame data generator 112A may acquire the footer information INFF generated by the footer generator 134 of the LINK-TX protocol manager 121, and generate the frame data. F including, as the image information, the pixel value information obtained by the imaging pixels of the imaging unit 11 and this footer information INFF.

Modification Example 8

In the above embodiment, the analyzer 223 is provided in an image processing unit 22C of a processing device 20C, and the analyzer 223 analyzes whether or not communication is being performed correctly, but the present disclosure is not limited thereto. Alternatively, for example, a device different from the processing device may analyze whether or not communication is being performed correctly, as in a communication system 1B illustrated in FIGS. 10 and 11. The communication system 1B includes a processing device 20B and an analysis device 30B. The processing device 20B includes an image processing unit 22B. The image processing unit 22B corresponds to the image processing unit 22 according to the above embodiment from which the analyzer 223 has been omitted, as illustrated in FIG. 11. The analysis device 30B is configured to analyze, in the test mode MB, whether or not communication is being performed correctly on the basis of the header information INFH included in the frame data F generated by the frame data receiver 222 of the image processing unit 22B. The analysis device 30B may be configured using a personal computer, for example, or may be a dedicated device that analyzes whether or not communication is being performed correctly.

Modification Example 9

In the above embodiment, the frame data F including the pixel value information obtained by the imaging pixels and the header information INFH including the same information as the information included in the header PH as the image information is transmitted to the processing device 20, but the present disclosure is not limited thereto. Alternatively, for example, the frame data F including the pixel value information obtained by the imaging pixels as the image information, and the header information INFH may be transmitted separately to the processing device 20. A communication system 1C according to the present modification example is described in detail below.

FIG. 12 illustrates a configuration example of the communication system 1C. The communication system 1C includes an imaging device 10C and the processing device 20C. The imaging device 10C includes an imaging unit 11C and a communication unit 13C.

FIG. 13 illustrates a configuration example of the imaging device 10C. The imaging unit 11C includes a frame data generator 112C. In both the normal mode MA and the test mode MB, the frame data generator 1120 generates the frame data F including the pixel value information obtained by the imaging pixels of the imaging unit 11 as the image information. The transmission unit 12 transmits the image data by transmitting the packets P via the eight transmission lanes L0 to L7.

The communication unit 13C is configured to exchange control signals with the processing device 20C. In the test mode MB, the communication unit 13C transmits the header information INFH to the processing device 20C.

The processing device 20C includes a communication unit 23C and the image processing unit 22C. The communication unit 23B is configured to exchange control signals with the imaging device 10C. In the test mode MB, the communication unit 23C receives the header information INFH transmitted from the imaging device 10C.

FIG. 14 illustrates a configuration example of the processing device 20C. The image processing unit 22C includes an analyzer 223C. The analyzer 223C is configured to analyze, in the test mode MB, whether or not communication is being performed correctly on the basis of the header information INFH received by the communication unit 23C.

Here, the imaging device 10C corresponds to a specific example of the "transmission device" in the present disclosure. The frame data generator 112C corresponds to a specific example of the "data generator" in the present disclosure. The communication unit 13C corresponds to a specific example of a "control information transmission unit" in the present disclosure. The processing device 20C corresponds to a specific example of the "reception device" in the present disclosure. The communication unit 23C corresponds to a specific example of a "control information reception unit" in the present disclosure. The analyzer 223C corresponds to a specific example of the "analyzer" in the present disclosure.

In this example, the communication unit 13C of the imaging device 10C transmits the header information INFH, and the communication unit 23C of the processing device 20C receives this header information INFH, but the present disclosure is not limited thereto. Alternatively, for example, as in the case of the communication system 1A according to the modification example 1 described above, the communication unit 13C of the imaging device 10C may transmit the footer information INFF, and the communication unit 23C of the processing device 20C may receive this footer information INFF.

Other Modification Examples

In addition, two or more of these modification examples may be combined with each other.

Although the present technology has been described with reference to the embodiment and some modification examples, the present technology is not limited to these embodiment, etc., and various modifications may be made.

For example, in the above embodiment, etc., one transmission unit 12 is provided in the imaging device 10, one reception unit 21 is provided in the processing device 20, and the transmission unit 12 transmits image data to the reception unit 21, but the present disclosure is not limited thereto. Alternatively, for example, a plurality of transmission units may be provided in the imaging device, a plurality of reception units may be provided in the processing device, and the plurality of transmission units may transmit image data to the plurality of reception units. The transmission unit may transmit image data to the reception unit corresponding to the transmission unit by using, for example, a plurality of transmission lanes L.

Further, in the above embodiment, etc., one imaging device 10 transmits image data to one processing device 20, but the present disclosure is not limited thereto. Alternatively, for example, a plurality of imaging devices may transmit image data to one processing device.

It is to be noted that the effects described in the present specification are merely illustrative and non-limiting, and other effects may be provided.

It is to be noted that the present technology may be configured as below. According to the present technology having the following configurations, it is possible to check whether or not communication is being performed correctly.

(1)
A transmission device including:
a data generator configured to generate image data including, as image information, pixel value information obtained by imaging pixels and control information and a transmission unit configured to transmit the image data.

(2)
The transmission device according to (1), in which the transmission unit is configured to generate a packet that includes a header including the control information and a payload including the image information, and is configured to transmit the image data by transmitting the packet.

(3)
The transmission device according to (2), in which
the payload includes the image information corresponding to one line of the image data, and
the control information includes information about the image information corresponding to the one line.

(4)
The transmission device according to (2) or (3), in which
the control information includes control data, and
the header further includes an error correction code of the control data, in addition to the control data.

(5)
The transmission device according to (2) or (3), in which the control information includes control data and an error correction code of the control data.

(6)
The transmission device according to any one of (1) to (5), in which
the transmission device has a first mode and a second mode, and
the data generator is
configured to generate the image data including the pixel value information and the control information as the image information in the first mode, and
configured to generate the image data including the pixel value information as the image information in the second mode.

(7)
The transmission device according to (6), in which
the transmission unit is configured to generate a packet that includes a header including the control information and a payload including the image data, and is configured to transmit the image data 1w transmitting the packet, and
the control information includes flag information having a first value in the first mode and having a second value in the second mode.

(8)
The transmission device according to (1), in which the transmission unit is configured to generate a packet that includes a payload including the image information and a footer including the control information, and is configured to transmit the image data by transmitting the packet.

(9)
The transmission device according to (8), in which
the payload includes the image information corresponding to one line of the image data, and
the control information includes an error correction code for the image information corresponding to the one line.

(10)
The transmission device according to any one of (1) to (9), in which the image data represents an image corresponding to an effective pixel region.

(11)
A reception device including:
a reception unit configured to receive image data including, as image information, pixel value information obtained by imaging pixels and control information; and
an analyzer configured to perform analysis processing on the basis of the control information included in the image data.

(12)
The reception device according to (11), in which the reception unit is configured to receive the image data by receiving a packet that includes a header including the control information and a payload including the image information.

(13)
The reception device according to (12), in which the reception unit further includes a verifier configured to verify the image data by comparing the control information included in the payload with the control information included in the header.

(14)

The reception device according to (11), in which the reception unit is configured to receive the image data by receiving a packet that includes a payload including the image information and a footer including the control information.

(15)

A communication system including:
a transmission device; and
a reception device, in which
the transmission device includes
   a data generator configured to generate image data including, as image information, pixel value information obtained by imaging pixels and control information, and
   a transmission unit configured to transmit the image data, and
the reception device includes
   a reception unit configured to receive the image data transmitted from the transmission device, and
   an analyzer configured to perform analysis processing on the basis of the control information included in the image data.

(16)

A communication system including:
a transmission device; and
a reception device, in which
the transmission device includes
   a data generator configured to generate image data including, as image information, pixel value information obtained by imaging pixels,
   a transmission unit configured to transmit the image data, and
   a control information transmission unit configured to transmit control information, and
the reception device includes
   a reception unit configured to receive the image data transmitted from the transmission device,
   a control information reception unit configured to receive the control information transmitted from the transmission device, and
   an analyzer configured to perform analysis processing on the basis of the control information.

(17)

The communication system according to (16), in which the transmission device has a first mode and a second mode, and
the control information transmission unit is configured to transmit the control information in the first mode.

(18)

The communication system according to (16) or (17), in which the transmission unit is configured to generate a packet that includes a header including the control information and a payload including the image information, and is configured to transmit the image data by transmitting the packet.

(19)

The communication system according to any one of (16) to (18), in which the transmission unit is configured to generate a packet that includes a payload including the image information and a footer including the control information, and is configured to transmit the image data by transmitting the packet.

This application claims the benefit of Japanese Priority Patent Application No. 2019-112495 filed with the Japan Patent Office on Jun. 18, 2019, the entire contents of each of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A transmission device comprising:
   a data generator configured to generate image data including, as image information, pixel value information obtained by imaging pixels and control information; and
   a transmission unit configured to transmit the image data, wherein
   the transmission device has a first mode and a second mode, and
   the data generator is configured to generate the image data including the pixel value information and the control information as the image information in the first mode, and is configured to generate the image data including the pixel value information as the image information in the second mode.

2. The transmission device according to claim 1, wherein the transmission unit is configured to generate a packet that includes a header including the control information and a payload including the image information, and is configured to transmit the image data by transmitting the packet.

3. The transmission device according to claim 2, wherein the payload includes the image information corresponding to one line of the image data, and
the control information includes information about the image information corresponding to the one line.

4. The transmission device according to claim 2, wherein the control information includes control data, and
the header further includes an error correction code of the control data, in addition to the control data.

5. The transmission device according to claim 2, wherein the control information includes control data and an error correction code of the control data.

6. The transmission device according, wherein
the transmission unit is configured to generate a packet that includes a header including the control information and a payload including the image data, and is configured to transmit the image data by transmitting the packet, and
the control information includes flag information having a first value in the first mode and having a second value in the second mode.

7. The transmission device according to claim 1, wherein the transmission unit is configured to generate a packet that includes a payload including the image information and a footer including the control information, and is configured to transmit the image data by transmitting the packet.

8. The transmission device according to claim 7, wherein the payload includes the image information corresponding to one line of the image data, and
the control information includes an error correction code for the image information corresponding to the one line.

9. The transmission device according to claim 1, wherein the image data represents an image corresponding to an effective pixel region.

10. A communication system comprising:
a transmission device; and
a reception device, wherein
the transmission device includes
- a data generator configured to generate image data including, as image information, pixel value information obtained by imaging pixels and control information, and
- a transmission unit configured to transmit the image data, and the reception device includes
- a reception unit configured to receive the image data transmitted from the transmission device, and
- an analyzer configured to perform analysis processing on a basis of the control information included in the image data, and wherein
- the transmission device has a first mode and a second mode, and
- the data generator is configured to generate the image data including the pixel value information and the control information as the image information in the first mode, and is configured to generate the image data including the pixel value information as the image information in the second mode.

11. A communication system comprising:
a transmission device; and a
reception device, wherein
the transmission device includes
- a data generator configured to generate image data including, as image information, pixel value information obtained by imaging pixels,
- a transmission unit configured to transmit the image data, and
- a control information transmission unit configured to transmit control information, and
the reception device includes
- a reception unit configured to receive the image data transmitted from the transmission device,
- a control information reception unit configured to receive the control information transmitted from the transmission device, and
- an analyzer configured to perform analysis processing on a basis of the control information, and wherein
- the transmission device has a first mode and a second mode, and
- the control information transmission unit is configured to transmit the control information in the first mode.

12. The communication system according to claim 11, wherein
the transmission unit is configured to generate a packet that includes a header including the control information and a payload including the image information, and is configured to transmit the image data by transmitting the packet.

13. The communication system according to claim 11, wherein the transmission unit is configured to generate a packet that includes a payload including the image information and a footer including the control information, and is configured to transmit the image data by transmitting the packet.

* * * * *